US012607899B2

(12) United States Patent
Hwang et al.

(10) Patent No.: US 12,607,899 B2
(45) Date of Patent: Apr. 21, 2026

(54) CAMERA MODULE AND ELECTRONIC DEVICE COMPRISING SAME

(71) Applicant: Samsung Electronics Co., Ltd., Suwon-si (KR)

(72) Inventors: Youngjae Hwang, Suwon-si (KR); Youngbok Yu, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 234 days.

(21) Appl. No.: 18/463,662

(22) Filed: Sep. 8, 2023

(65) Prior Publication Data

US 2023/0418129 A1 Dec. 28, 2023

Related U.S. Application Data

(63) Continuation of application No. PCT/KR2022/005332, filed on Apr. 13, 2022.

(30) Foreign Application Priority Data

Apr. 16, 2021 (KR) ........................ 10-2021-0050076

(51) Int. Cl.
G03B 3/10 (2021.01)
G03B 5/02 (2021.01)
(Continued)

(52) U.S. Cl.
CPC ................ G03B 3/10 (2013.01); G03B 5/02 (2013.01); G03B 5/04 (2013.01); G03B 17/12 (2013.01);
(Continued)

(58) Field of Classification Search
CPC ....... G03B 27/646; H04N 23/55; H04N 23/57
See application file for complete search history.

(56) References Cited

U.S. PATENT DOCUMENTS 8,482,869 B2 7/2013 Yamauchi
9,134,503 B2 9/2015 Topliss
(Continued)

FOREIGN PATENT DOCUMENTS

KR 10-2010-0066678 A 6/2010
KR 10-2010-0109831 A 10/2010
(Continued)

OTHER PUBLICATIONS

International Search Report dated Jul. 28, 2022, issued in International Patent Application No. PCT/KR2022/005332.
(Continued)

*Primary Examiner* — Noam Reisner
(74) *Attorney, Agent, or Firm* — Jefferson IP Law, LLP

(57) ABSTRACT

A camera module is provided. The camera module includes a camera housing including an image sensor, a lens assembly including a lens aligned with the image sensor in a direction of an optical axis, a first holder coupled to the lens assembly and configured to move together with the lens assembly in a first direction perpendicular to the optical axis and a second direction perpendicular to each of the optical axis and the first direction, a first magnet being disposed on a first side surface of the first holder, a first coil disposed on a first inner side surface of the camera housing, the first coil being disposed to at least partially overlap each of an N-pole region and an S-pole region of the first magnet when viewed in the second direction, and a second coil disposed on the first inner side surface of the camera housing.

20 Claims, 16 Drawing Sheets

(51) Int. Cl.
  *G03B 5/04*       (2021.01)
  *G03B 17/12*      (2021.01)
(52) U.S. Cl.
  CPC ............... *G03B 2205/0015* (2013.01); *G03B 2205/0069* (2013.01); *G03B 2217/002* (2013.01)

(56) References Cited

U.S. PATENT DOCUMENTS

| | | | |
|---|---|---|---|
| 9,134,587 B2 | 9/2015 | Lim et al. | |
| 9,319,574 B2 | 4/2016 | Shin et al. | |
| 9,438,801 B2 | 9/2016 | Hwang et al. | |
| 9,759,928 B2 | 9/2017 | Lim et al. | |
| 9,832,383 B2 | 11/2017 | Hwang et al. | |
| 10,101,595 B2 | 10/2018 | Hu et al. | |
| 10,386,651 B2 | 8/2019 | Kim et al. | |
| 10,996,484 B2 | 5/2021 | Hu et al. | |
| 2010/0316363 A1* | 12/2010 | Chou | G03B 17/00 396/55 |
| 2011/0211821 A1 | 9/2011 | Park et al. | |
| 2012/0120506 A1 | 5/2012 | Yamauchi | |
| 2013/0163085 A1 | 6/2013 | Lim et al. | |
| 2014/0009631 A1 | 1/2014 | Topliss | |
| 2014/0362284 A1 | 12/2014 | Shin et al. | |
| 2015/0049209 A1 | 2/2015 | Hwang et al. | |
| 2016/0004091 A1 | 1/2016 | Lim et al. | |
| 2017/0160558 A1 | 6/2017 | Kim et al. | |
| 2017/0285363 A1 | 10/2017 | Hu et al. | |
| 2018/0356646 A1 | 12/2018 | Hu et al. | |
| 2019/0294027 A1* | 9/2019 | Kim | G03B 5/00 |
| 2020/0153366 A1* | 5/2020 | I | H04N 23/54 |
| 2020/0225442 A1* | 7/2020 | Weng | H04N 23/54 |
| 2021/0223565 A1 | 7/2021 | Hu et al. | |
| 2021/0223566 A1 | 7/2021 | Hu et al. | |

FOREIGN PATENT DOCUMENTS

| | | |
|---|---|---|
| KR | 10-1017341 B1 | 2/2011 |
| KR | 10-2013-0072721 A | 7/2013 |
| KR | 10-2015-0080367 A | 7/2015 |
| KR | 10-2016-0005956 A | 1/2016 |
| KR | 10-1792441 B1 | 10/2017 |
| KR | 10-2018-0057593 A | 5/2018 |

OTHER PUBLICATIONS

Extended European Search Report dated Sep. 6, 2024, issued in European patent application No. 22788428.5.

* cited by examiner

100

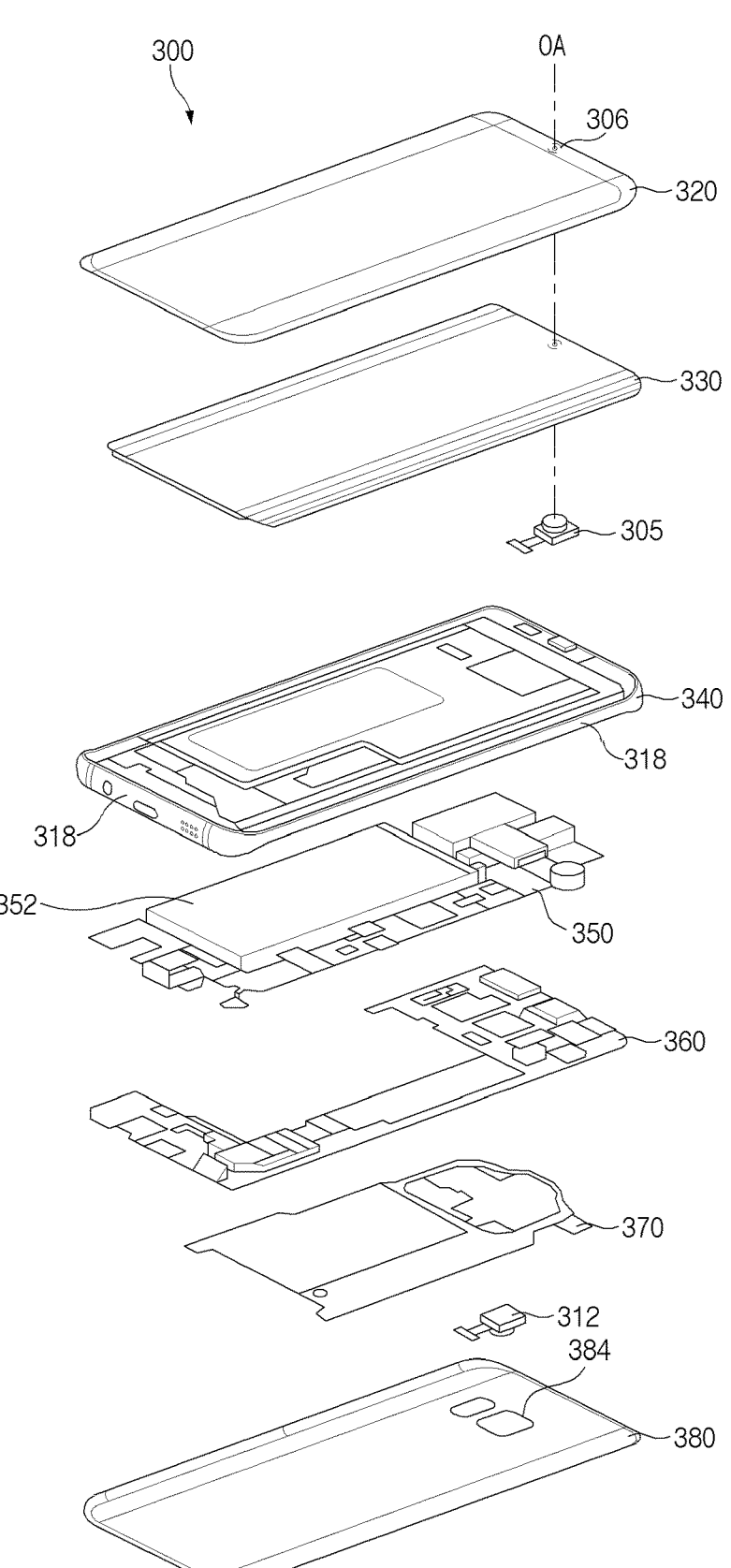
F I G . 3C

400

CAMERA MODULE AND ELECTRONIC DEVICE COMPRISING SAME

CROSS-REFERENCE TO RELATED APPLICATION(S)

This application is a continuation application, claiming priority under § 365(c), of an International application No. PCT/KR2022/005332, filed on Apr. 13, 2022, which is based on and claims the benefit of a Korean patent application number filed on Apr. 16, 2021, in the Korean Intellectual Property Office, the disclosure of which is incorporated by reference herein in its entirety.

BACKGROUND

1. Field

The disclosure relates to a camera module and an electronic device including the same.

2. Description of Related Art

A camera module may perform an image stabilization function for image correction in response to a disturbance. The image stabilization function may be implemented in a manner where a position of light received by an image sensor is changed by moving a lens. The camera module may include at least one coil and magnet for the image stabilization function. The coil to which current is applied may generate an electromagnetic force through electromagnetic interaction with the magnet.

The above information is presented as background information only to assist with an understanding of the disclosure. No determination has been made, and no assertion is made, as to whether any of the above might be applicable as prior art with regard to the disclosure.

SUMMARY

The camera module may move the lens in first and second directions. To this end, the camera module may include a first driving unit associated with movement in the first direction and a second driving unit associated with movement in the second direction. The first driving unit and the second driving unit may be disposed on different surfaces to limit magnetic interference with each other. Due to this structure, the size of the camera module may be increased.

Aspects the disclosure are to address at least the above-mentioned problems and/or disadvantages and to provide at least the advantages described below. Accordingly, an aspect of the disclosure is to provide a miniaturized camera module by configuring a first driving unit and a second driving unit related to an image stabilization function with a coil and a magnet disposed on one surface.

Additional aspects will be set forth in part in the description which follows and, in part, will be apparent from the description, or may be learned by practice of the presented embodiments.

In accordance with an aspect of the disclosure, a camera module is provided. The camera module includes a camera housing including an image sensor, a lens assembly including a lens aligned with the image sensor in a direction of an optical axis (OA), a first holder coupled to the lens assembly and configured to move together with the lens assembly in a first direction perpendicular to the optical axis and a second direction perpendicular to each of the optical axis and the first direction, a first magnet being disposed on a first side surface of the first holder, a first coil disposed on a first inner side surface of the camera housing, the first coil being disposed to at least partially overlap each of an N-pole region and an S-pole region of the first magnet when viewed in the second direction, and a second coil disposed on the first inner side surface of the camera housing and disposed adjacent to the first coil, the second coil being disposed to at least partially overlap any one of the N-pole region and the S-pole region of the first magnet when viewed in the second direction.

In accordance with another aspect of the disclosure, an electronic device is provided. The electronic device includes a housing and a camera module disposed in the housing, in which the camera module includes a camera housing, a camera assembly disposed in the camera housing and including a lens assembly, a first driving unit including a first coil and a second coil disposed on a first inner side surface of the camera housing, and a first magnet disposed on a first side surface of the camera assembly, and a second driving unit including a third coil disposed on a second inner side surface of the camera housing and a second magnet disposed on a second side surface of the camera assembly, the first magnet is configured so that a first facing surface facing the first coil and the second coil has an N-pole region and an S-pole region, the first coil at least partially overlaps each of the N-pole region and the S-pole region of the first magnet when viewed in a second direction perpendicular to an optical axis, and the second coil is configured to at least partially overlap any one of the N-pole region or the S-pole region of the first magnet when viewed in the second direction perpendicular to the optical axis.

According to embodiments of the disclosure, a miniaturized camera module can be provided by reducing an area occupied by a coil and a magnet. In addition, a camera module according to the embodiments disclosed in the disclosure is configured to perform a 2-axis image stabilization function using one magnet, so that production costs can be reduced.

Besides, various effects may be provided that are directly or indirectly identified through the disclosure.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 3C is an exploded perspective view of the electronic device according to an embodiment of the disclosure;

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
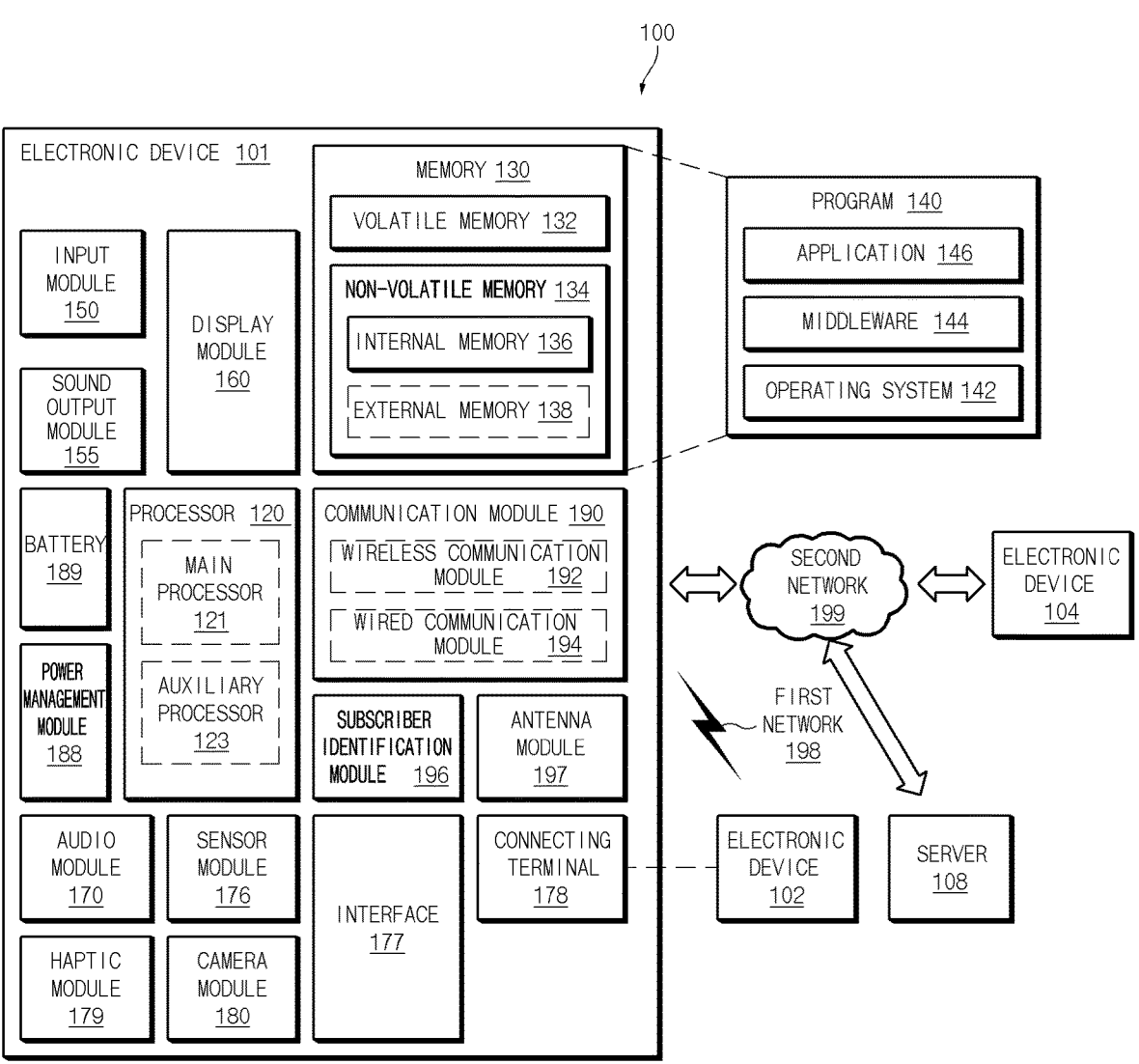
FIG. 1 is a block diagram illustrating an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an external electronic device 102 via a first network 198 (e.g., a short-range wireless communication network), or at least one of an external electronic device 104 or a server 108 via a second network 199 (e.g., a long-range wireless communication network). According to an embodiment of the disclosure, the electronic device 101 may communicate with the external electronic device 104 via the server 108. According to an embodiment of the disclosure, the electronic device 101 may include a processor 120, a memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments of the disclosure, at least one of the components (e.g., the connecting terminal 178) may be omitted from the electronic device 101, or one or more other components may be added in the electronic device 101. In some embodiments of the disclosure, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment of the disclosure, as at least part of the data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an embodiment of the disclosure, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., a sleep) state, or together with the main processor 121 while the main processor 121 is in an active state (e.g., executing an application). According to an embodiment of the disclosure, the auxiliary processor 123 (e.g., an image signal processor or a communication processor) may be implemented as part of another component (e.g., the camera module 180 or the communication module 190) functionally related to the auxiliary processor 123. According to an embodiment of the disclosure, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers.

The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134. The non-volatile memory 134 may include an internal memory 136 and an external memory 138.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment of the disclosure, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment of the disclosure, the display module 160 may include a touch sensor adapted to detect a touch, or a pressure sensor adapted to measure the intensity of force incurred by the touch.

The audio module 170 may convert a sound into an electrical signal and vice versa. According to an embodiment of the disclosure, the audio module 170 may obtain the sound via the input module 150, or output the sound via the sound output module 155 or a headphone of an external electronic device (e.g., the external electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment of the disclosure, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the external electronic device 102) directly (e.g., wiredly) or wirelessly.

According to an embodiment of the disclosure, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the external electronic device 102). According to an embodiment of the disclosure, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment of the disclosure, the haptic module 179 may include, for example, a motor, a piezoelectric element, or an electric stimulator.

The camera module 180 may capture a still image or moving images. According to an embodiment of the disclosure, the camera module 180 may include one or more lenses, image sensors, image signal processors, or flashes.

The power management module 188 may manage power supplied to the electronic device 101. According to one embodiment of the disclosure, the power management module 188 may be implemented as at least part of, for example, a power management integrated circuit (PMIC).

The battery 189 may supply power to at least one component of the electronic device 101. According to an embodiment of the disclosure, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the external electronic device 102, the external electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment of the disclosure, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a fifth generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the external electronic device 104), or a network system (e.g., the second network 199). According to an embodiment of the disclosure, the wireless communication module 192 may support a peak data rate (e.g., 20 gigabits per second (Gbps) or more) for implementing eMBB, loss coverage (e.g., 164 decibels (dB) or less) for implementing mMTC, or U-plane latency (e.g., 0.5 milliseconds (ms) or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment of the disclosure, the antenna module 197 may include an antenna including a radiating element a conductive material or a conductive pattern formed in or on a substrate (e.g., a printed circuit board (PCB)). According to an embodiment of the disclosure, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment of the disclosure, another component (e.g., a radio frequency integrated circuit (RFIC)) other than the radiating element may be additionally formed as part of the antenna module 197.

According to various embodiments of the disclosure, the antenna module 197 may form a mmWave antenna module. According to an embodiment of the disclosure, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment of the disclosure, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment of the disclosure, the external electronic device 104 may include an internet-of-things (IoT) device. The server 108 may be an intelligent server using machine learning and/or a neural network. According to an embodiment of the disclosure, the external electronic device 104 or the server 108 may be included in the second network 199. The electronic device 101 may be applied to intelligent services (e.g., a smart home, a smart city, a smart car, or healthcare) based on 5G communication technology or IoT-related technology.

Figure 2:
FIG. 2 is a block diagram illustrating a camera module, according to an embodiment of the disclosure.
Figure 2:
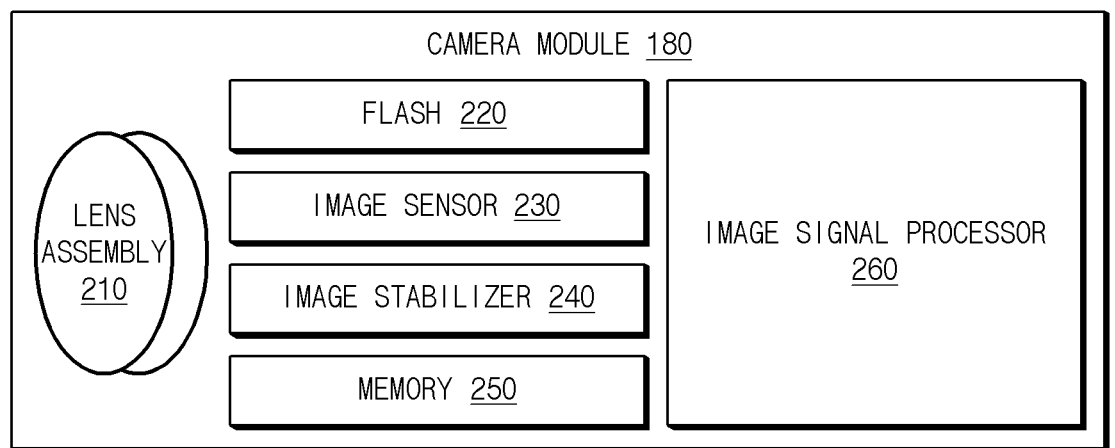

FIG. 2 is a block diagram 200 illustrating a camera module according to an embodiment of the disclosure.

Referring to FIG. 2, the camera module 180 may include a lens assembly 210, a flash 220, an image sensor 230, an image stabilizer 240, a memory 250 (e.g., a buffer memory), or an image signal processor 260.

The lens assembly 210 may collect light emitted or reflected from an object whose image is to be taken. The lens assembly 210 may include one or more lenses. According to an embodiment of the disclosure, the camera module 180 may include a plurality of lens assemblies 210. In such a case, the camera module 180 may form, for example, a dual camera, a 360-degree camera, or a spherical camera. Some of the plurality of lens assemblies 210 may have the same lens attribute (e.g., view angle, focal length, auto-focusing, f number, or optical zoom), or at least one lens assembly may have one or more lens attributes different from those of another lens assembly. The lens assembly 210 may include, for example, a wide-angle lens or a telephoto lens.

The flash 220 may emit light that is used to reinforce light reflected from an object. According to an embodiment of the disclosure, the flash 220 may include one or more light emitting diodes (LEDs) (e.g., a red-green-blue (RGB) LED, a white LED, an infrared (IR) LED, or an ultraviolet (UV) LED) or a xenon lamp.

An image sensor 230 may obtain an image corresponding to an object by converting light emitted or reflected from the object and transmitted via the lens assembly 210 into an electrical signal. According to an embodiment of the disclosure, the image sensor 230 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 230 may be implemented using, for example, a charged coupled device (CCD) sensor or a complementary metal oxide semiconductor (CMOS) sensor.

The image stabilizer 240 may move the image sensor 230 or at least one lens included in the lens assembly 210 in a particular direction, or control an operational attribute (e.g., adjust the read-out timing) of the image sensor 230 in response to the movement of the camera module 180 or the electronic device 101 including the camera module 180. This allows compensating for at least part of a negative effect (e.g., image blurring) by the movement on an image being captured. According to an embodiment of the disclosure, the image stabilizer 240 may sense such a movement by the camera module 180 or the electronic device 101 using a gyro sensor (not shown) or an acceleration sensor (not shown) disposed inside or outside the camera module 180. According to an embodiment of the disclosure, the image stabilizer 240 may be implemented, for example, as an optical image stabilizer.

The memory 250 may store, at least temporarily, at least part of an image obtained via the image sensor 230 for a subsequent image processing task. For example, if image capturing is delayed due to shutter lag or multiple images are quickly captured, a raw image obtained (e.g., a Bayer-patterned image, a high-resolution image) may be stored in the memory 250, and its corresponding copy image (e.g., a low-resolution image) may be previewed via the display module 160. Thereafter, if a specified condition is met (e.g., by a user's input or system command), at least part of the raw image stored in the memory 250 may be obtained and processed, for example, by the image signal processor 260. According to an embodiment of the disclosure, the memory 250 may be configured as at least part of the memory 130 or as a separate memory that is operated independently from the memory 130.

The image signal processor 260 may perform one or more image processing with respect to an image obtained via the image sensor 230 or an image stored in the memory 250. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 260 may perform control (e.g., exposure time control or read-out timing control) with respect to at least one (e.g., the image sensor 230) of the components included in the camera module 180. An image processed by the image signal processor 260 may be stored back in the memory 250 for further processing, or may be provided to an external component (e.g., the memory 130, the display module 160, the external electronic device 102, the external electronic device 104, or the server 108) outside the camera module 180.

According to an embodiment of the disclosure, the image signal processor 260 may be configured as at least part of the processor 120, or as a separate processor that is operated independently from the processor 120. If the image signal processor 260 is configured as a separate processor from the processor 120, at least one image processed by the image signal processor 260 may be displayed, by the processor 120, via the display module 160 as it is or after being further processed.

According to an embodiment of the disclosure, the electronic device 101 may include a plurality of camera modules 180 having different attributes or functions. In such a case, at least one of the plurality of camera modules 180 may form, for example, a wide-angle camera and at least another of the plurality of camera modules 180 may form a telephoto camera. Similarly, at least one of the plurality of camera modules 180 may form, for example, a front camera and at least another of the plurality of camera modules 180 may form a rear camera.

Figure 3A:
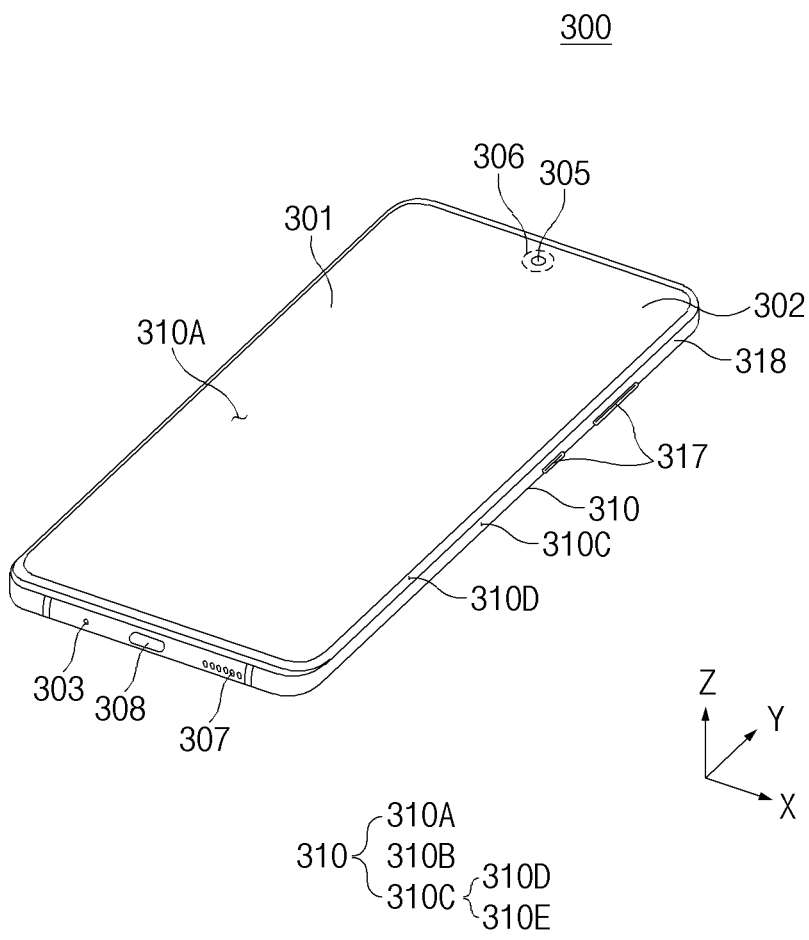
FIG. 3A is a front perspective view of an electronic device according to an embodiment of the disclosure.
Figure 3B:
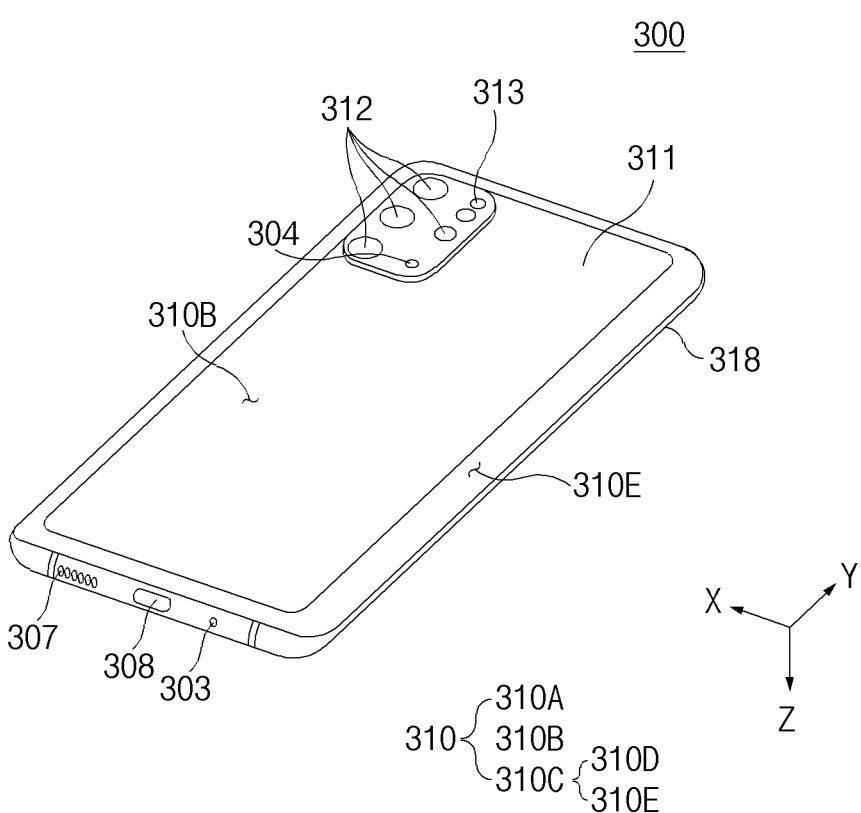
FIG. 3B is a rear perspective view of the electronic device according to an embodiment of the disclosure.

FIG. 3A is a front perspective view of an electronic device 300 according to an embodiment of the disclosure. FIG. 3B is a rear perspective view of the electronic device 300 according to an embodiment of the disclosure. FIG. 3C is an exploded perspective view of the electronic device 300 according to an embodiment of the disclosure.

Referring to FIGS. 3A and 3B, the electronic device 300 may include a housing 310 including a first surface (or front surface) 310A, a second surface (or back surface) 310B, and a side surface 310C surrounding a space between the first surface 310A and the second surface 310B.

In another embodiment (not illustrated) of the disclosure, the housing 310 may refer to a structure forming a portion of the first surface 310A, the second surface 310B, and the side surface 310C.

In an embodiment of the disclosure, the first surface 310A may be formed by a front plate 302 (e.g., a front plate 320 of FIG. 3C) of which at least a portion is substantially transparent. The front plate 302 may include a glass plate including various coating layers, or a polymer plate. In an embodiment of the disclosure, the second surface 310B may be formed by a substantially opaque back plate 311 (e.g., a back plate 380 in FIG. 3C). The back plate 311 may be formed, for example, by coated or colored glass, ceramic, polymer, metal (e.g., aluminum, stainless steel (STS), or magnesium), or a combination of at least two of the above materials. The side surface 310C may be coupled with the front plate 302 and the back plate 311, and may be formed by a side bezel structure 318 that includes metal and/or polymer.

In another embodiment of the disclosure, the back plate 311 and the side bezel structure 318 may be integrally formed, and may include the same material (e.g., a metal material, such as aluminum).

In the illustrated embodiment of the disclosure, the front plate 302 may include two first regions 310D that are bent from a partial region of the first surface 310A toward the back plate 311 and extend seamlessly. The first regions 310D may be positioned at both ends of a long edge of the front plate 302.

In the illustrated embodiment of the disclosure, the back plate 311 may include two second regions 310E that are bent from a partial region of the second surface 310B toward the front plate 302 and extend seamlessly. The second regions 310E may be included at both ends of a long edge of the back plate 311.

In another embodiment of the disclosure, the front plate 302 (or the back plate 311) may include only one of the first regions 310D (or the second regions 310E). In addition, in another embodiment of the disclosure, the front plate 302 (or the back plate 311) may not include some of the first regions 310D (or the second regions 310E).

In an embodiment of the disclosure, when viewed from the side of the electronic device 300, the side bezel structure 318 may have a first thickness (or width) in a lateral direction (e.g., a short side) in which the first regions 310D or the second regions 310E as described above are not included, and may have a second thickness thinner than the first thickness in a lateral direction (e.g., a long side) in which the first regions 310D or the second regions 310E are included.

In an embodiment of the disclosure, the electronic device 300 may include at least one of a display 301 (e.g., the display module 160 of FIG. 1), audio modules 303, 304, and 307 (e.g., the audio module 170 of FIG. 1), a sensor module (not illustrated) (e.g., the sensor module 176 of FIG. 1), camera modules 305 and 312 (e.g., the camera module 180 of FIG. 1 or a camera module 400 of FIG. 4), key input devices 317 (e.g., the input module 150 of FIG. 1), a light emitting element (not illustrated), and a connector hole 308 (e.g., the connection terminal 178 of FIG. 1). In another embodiment of the disclosure, the electronic device 300 may omit at least one of the components (e.g., the key input devices 317 or the light emitting element (not illustrated)) or may additionally include other components.

In an embodiment of the disclosure, the display 301 may be exposed through at least a portion of the front plate 302. For example, at least a portion of the display 301 may be exposed through the front plate 302 including the first surface 310A and the first regions 310D of the side surface 310C.

In an embodiment of the disclosure, a shape of the display 301 may be formed to be substantially the same as a shape of an outer edge of the front plate 302 adjacent to the display 301. In another embodiment (not illustrated), in order to expand the area where the display 301 is exposed, an interval between the outer edge of the display 301 and the outer edge of the front plate 302 may be formed to be substantially the same as each other.

In an embodiment of the disclosure, the surface of the housing 310 (or the front plate 302) may include a display region in which the display 301 is visually exposed and content is displayed through pixels. For example, the display region may include the first surface 310A and the first region 310D of the side surface.

In another embodiment of the disclosure, the display regions 310A and 310D may include a sensing region (not illustrated) configured to obtain biometric information of a user. Here, it is to be understood that "the display regions 310A and 310D includes the sensing region" means that at least a portion of the sensing region may overlap the display regions 310A and 310D. For example, the sensing region (not illustrated) may mean a region in which content may be displayed by the display 301 like other regions of the display regions 310A and 310D, and additionally, biometric information (e.g., fingerprint) of the user may be obtained.

In an embodiment of the disclosure, the display regions 310A and 310D of the display 301 may include a camera region 306. For example, the camera region 306 may be a region through which light reflected from a subject and received by the first camera module 305 passes. For example, the camera region 306 may include a region through which an optical axis (e.g., an optical axis (OA) of FIG. 4) of the first camera module 305 passes. Here, it is to be understood that "the display regions 310A and 310D includes the camera region 306" means that at least a portion of the camera region 306 may overlap the display regions

310A and 310D. For example, the camera region 306 may display content through the display 301 like other regions of the display regions 310A and 310D.

In various embodiments (not illustrated) of the disclosure, the display regions 310A and 310D of the display 301 may include a region to which a first camera module 305 (e.g., a punch hole camera) may be visually exposed. For example, in a region where the first camera module 305 is exposed, at least a portion of its edge may be surrounded by the display regions 310A and 310D. In an embodiment of the disclosure, the first camera module 305 may include a plurality of camera modules (e.g., the camera module 180 of FIG. 1 and the camera module 400 of FIG. 4).

In an embodiment of the disclosure, the display 301 may include at least one of audio modules 303, 304, and 307, a sensor module (not illustrated), a camera module (e.g., the first camera module), and a light emitting element (not illustrated) on a back surface of the display regions 310A and 310D. For example, the electronic device 300 may be disposed so that the camera module (e.g., the first camera module 305) faces the first surface 310A and/or the side surface 310C on the back surface (e.g., the surface facing a −Z-axis direction) of the first surface 310A (e.g., the front surface) and/or the side surface 310C (e.g., at least one surface of the first region 310D). For example, the first camera module 305 may not be visually exposed to the display regions 310A and 310D, and may include a hidden under display camera (UDC).

In another embodiment (not illustrated), the display 301 may include or be disposed adjacent to a touch sensing circuit, a pressure sensor capable of measuring the intensity (pressure) of the touch, and/or a digitizer detecting a magnetic field type stylus pen.

In an embodiment of the disclosure, the audio modules 303, 304, and 307 may include microphone holes 303 and 304 and a speaker holes 307.

In an embodiment of the disclosure, the microphone holes 303 and 304 may include a first microphone hole 303 formed in a partial region of the side surface 310C and a second microphone hole 304 formed in a partial region of the second surface 310B. In the microphone holes 303 and 304, microphones for acquiring external sound may be disposed in the housing 310. A plurality of microphones may be included to be able to detect a direction of sound. In an embodiment of the disclosure, the second microphone hole 304 formed in a partial region of the second surface 310B may be disposed adjacent to the camera modules 305 and 312. For example, the second microphone hole 304 may acquire sound when the camera modules 305 and 312 are executed or acquire sound when other functions are executed.

In an embodiment of the disclosure, the speaker hole 307 may include a receiver hole (not illustrated) for communication. The speaker hole 307 may be formed in a portion of the side surface 310C of the electronic device 300. In another embodiment of the disclosure, the speaker hole 307 and the microphone hole 303 may be implemented as one hole. Although not illustrated, the receiver hole (not illustrated) for communication may be formed in a different portion of the side surface 310C. For example, the receiver hole (not illustrated) for communication may be formed in a different portion of the side surface 310C (e.g., a portion facing the +Y-axis direction) opposite the portion of the side surface 310C in which the speaker hole 307 is formed (e.g., a portion facing a −Y-axis direction).

In an embodiment of the disclosure, the electronic device 300 may include a speaker that is fluidly connected to the speaker hole 307. In another embodiment of the disclosure, the speaker may include a piezo speaker in which the speaker hole 307 is omitted.

In an embodiment of the disclosure, a sensor module (not illustrated) (e.g., the sensor module 176 of FIG. 1) may generate an electrical signal or a data value corresponding to an internal operating state or an external environmental state of the electronic device 300. In an embodiment of the disclosure, the sensor module (not illustrated) may be disposed on at least some of the first surface 310A, the second surface 310B, or the side surface 310C (e.g., the first regions 310D and/or the second regions 310E) of the housing 310, and may be disposed on the back surface of the display 301 (e.g., a fingerprint sensor). For example, at least a portion of the sensor module (not illustrated) may be disposed beneath the display regions 310A and 310D so that it is not visually exposed, and form a sensing region (not illustrated) on at least a portion of the display regions 310A and 310D. For example, the sensor module (not illustrated) may include an optical fingerprint sensor. In some embodiments (not illustrated), the fingerprint sensor may be disposed on the second surface 310B as well as on the first surface 310A (e.g., the display regions 310A and 310D) of the housing 310. The sensor module may include, for example, at least one of a proximity sensor, a heart rate monitoring (HRM) sensor, a fingerprint sensor, a gesture sensor, a gyro sensor, an atmospheric pressure sensor, a magnetic sensor, an acceleration sensor, a grip sensor, a color sensor, an infrared (IR) sensor, a biometric sensor, a temperature sensor, a humidity sensor, or an illuminance sensor.

In an embodiment of the disclosure, the key input device 317 may be disposed on the side surface 310C of the housing 310 (e.g., the first regions 310D and/or the second regions 310E). In another embodiment of the disclosure, the electronic device 300 may not include some or all of the key input devices 317, and the key input device(s) 317 which is (are) not included may be implemented in other forms, such as a soft key, on the display 301. In another embodiment of the disclosure, the key input device may include a sensor module (not illustrated) forming the sensing region (not illustrated) included in the display regions 310A and 310D.

In an embodiment of the disclosure, the connector hole 308 may accommodate a connector. The connector hole 308 may be disposed in the side surface 310C of the housing 310. For example, the connector hole 308 may be disposed in the side surface 310C to be adjacent to at least a portion of the audio module (e.g., the microphone hole 303 and the speaker hole 307). In another embodiment of the disclosure, the electronic device 300 may include a first connector hole 308 capable of accommodating a connector (e.g., a USB connector) for transmitting and receiving electric power and/or data to and from an external electronic device, and/or a second connector hole (not illustrated) capable of accommodating a connector (e.g., an earphone jack) for transmitting and receiving audio signals to and from an external electronic device.

In an embodiment of the disclosure, the electronic device 300 may include the light emitting element (not illustrated). For example, the light emitting element (not illustrated) may be disposed on the first surface 310A of the housing 310. The light emitting element (not illustrated) may provide state information about the electronic device 300 in the form of light. In another embodiment of the disclosure, the light emitting element (not illustrated) may provide a light source interworking with an operation of the first camera module 305. For example, the light emitting element (not illustrated) may include an LED, an IR LED, and/or a xenon lamp.

In an embodiment of the disclosure, the camera modules 305 and 312 (e.g., the camera module 180 of FIG. 1 and the camera module 400 of FIG. 4) may include the first camera module 305 (e.g., an under display camera) configured to receive light through the camera region 306 of the first surface 310A of the electronic device 300, the second camera module 312 configured to receive light through a partial region of the second surface 310B (e.g., the rear camera region 384 of FIG. 3C), and/or a flash 313.

In an embodiment of the disclosure, the first camera module 305 may include an under display camera (UDC) disposed on the back surface of the display 301. For example, the first camera module 305 may be positioned on some layers of the display 301, or positioned so that an optical axis of the lens (e.g., the optical axis (OA) of FIG. 4) passes through the display regions 310A and 310D of the display. In various embodiments of the disclosure, the first camera module 305 may be configured to receive light through the camera region 306 included in the display regions 310A and 310D. For example, the camera region 306 may be configured to display content similar to other regions of the display regions 310A and 310D when the first camera module 305 is not operating. For example, when the first camera module 305 is operating, the camera region 306 may not display content, and the first camera module 305 may receive light through the camera region 306.

In various embodiments (not illustrated) of the disclosure, the first camera module 305 (e.g., a punch hole camera) may be exposed through a portion of the display regions 310A and 310D of the display 301. For example, the first camera module 305 may be exposed as a partial region of the display regions 310A and 310D through an opening formed in a portion of the display 301.

In an embodiment of the disclosure, the second camera module 312 may include a plurality of camera modules (e.g., a dual camera, a triple camera, or a quad camera). However, the second camera module 312 is not necessarily limited to including a plurality of camera modules, and may include a single camera module.

In an embodiment of the disclosure, the first camera module 305 and/or the second camera module 312 may include one or a plurality of lenses, an image sensor (e.g., the image sensor 230 of FIG. 2), and/or an image signal processor (e.g., the image signal processor 260 of FIG. 2). The flash 313 may include, for example, a light emitting diode or a xenon lamp. In another embodiment of the disclosure, two or more lenses (infrared camera, wide-angle, and telephoto lenses) and image sensors may be disposed in the housing to face the direction in which one surface (e.g., the second surface 310B) of the electronic device 300 is facing.

Referring to FIG. 3C, the electronic device 300 may include the side bezel structure 318, a first support member 340 (e.g., a bracket), the front plate 320 (e.g., the front plate 302 in FIG. 3A), a display 330 (e.g., the display 301 in FIG. 3A), a printed circuit board 350 (e.g., a printed circuit board (PCB), a flexible PCB (FPCB), or a rigid-flexible PCB (RFPCB)), a battery 352, a second support member 360 (e.g., a rear case), an antenna 370, and a back plate 380 (e.g., the back plate 311 of FIG. 3B). In some embodiments of the disclosure, the electronic device 300 may omit at least one of the components (e.g., the first support member 340 or the second support member 360) or may additionally include other components. At least one of the components of the electronic device 300 may be the same as or similar to at least one of the components of the electronic device 300 of FIG. 3A or 3B, and the description thereof will not be repeated below.

In an embodiment of the disclosure, the first support member 340 may be disposed in the electronic device 300 to be connected to the side bezel structure 318 or may be integrally formed with the side bezel structure 318. The first support member 340 may be formed of, for example, a metal material and/or a non-metal (e.g., polymer) material. The first support member 340 may have the display 330 coupled to or positioned on one surface and the printed circuit board 350 coupled to or positioned on the other surface.

In an embodiment of the disclosure, on the printed circuit board 350, a processor, memory, and/or interface may be disposed. The processor may include, for example, one or more of a central processing unit, an application processor, a graphic processing unit, an image signal processor, a sensor hub processor, or a communication processor.

In an embodiment of the disclosure, the memory may include, for example, a volatile memory or a non-volatile memory.

In an embodiment of the disclosure, the interface may include, for example, a high-definition multimedia interface (HDMI), a universal serial bus (USB) interface, a secure digital (SD) card interface, and/or an audio interface. The interface may electrically or physically connect the electronic device 300 to an external electronic device, for example, and may include a USB connector, an SD card/multimedia card (MMC) connector, or an audio connector.

In an embodiment of the disclosure, the battery 352 may be a device for supplying power to at least one of the components of the electronic device 300, and may include, for example, a primary cell which is not rechargeable, a secondary cell which is rechargeable, or a fuel cell. At least a portion of the battery 352 may be disposed, for example, on substantially the same plane as the printed circuit board 350. The battery 352 may be integrally disposed inside the electronic device 300, or may be disposed to be detachable from the electronic device 300.

In an embodiment of the disclosure, the antenna 370 may be disposed between the back plate 380 and the battery 352. The antenna 370 may include, for example, a near field communication (NFC) antenna, a wireless charging antenna, and/or a magnetic secure transmission (MST) antenna. The antenna 370 may, for example, perform short range communication with an external device, or may wirelessly transmit and receive electric power required for charging. In another embodiment of the disclosure, an antenna structure may be formed by the side bezel structure 318 and/or a portion of the first support member 340 or a combination thereof.

In an embodiment of the disclosure, the first camera module 305 may be coupled to the back surface of the display 330 to receive light through the camera region 306 of the front plate 320. For example, at least a portion of the first camera module 305 may be disposed on the first support member 340. For example, the image sensor of the first camera module 305 (e.g., the image sensor 230 of FIG. 2 or the image sensor 419 of FIG. 5) may receive light passing through the camera region 306 and a pixel array included in the display 330. For example, the camera region 306 may at least partially overlap the display region where content is displayed. For example, for the first camera module 305, the optical axis (OA) of the first camera module 305 may pass through a partial region of the display 330 and the camera region 306 of the front plate 320. For example, the partial region may include the pixel array including a plurality of light emitting elements. In an embodiment of the disclosure, a partial region of the display 330 facing the first camera module 305 may be formed as a transmission region having a transmittance specified as a portion of the display region where content is displayed. In an embodiment of the disclosure, the transmission region may be formed to have a transmittance ranging from about 5% to about 25%. In an embodiment of the disclosure, the transmission region may be formed to have a transmittance ranging from about 25% to about 50%. In an embodiment of the disclosure, the transmission region may be formed to have a transmittance of about 50% or more. Such a transmission region may include a region overlapping an effective region (e.g., a field of view (FOV)) of the first camera module 305, through which light formed at the image sensor (e.g., the image sensor 230 of FIG. 2 or the image sensor 419 of FIG. 5) for generating an image passes. For example, the transmission region of the display 330 may include a region having a lower pixel density and/or wiring density than a surrounding region.

In an embodiment of the disclosure, the second camera module 312 may be disposed so that the lens is exposed to the rear camera region 384 of the back plate 380 (e.g., the back surface 310B of FIG. 2) of the electronic device 300. The rear camera region 384 may be formed on at least a portion of the surface of the back plate 380 (e.g., the back surface 310B of FIG. 2). In an embodiment of the disclosure, the rear camera region 384 may be formed to be at least partially transparent so that the second camera module 312 receives external light through the rear camera region 384.

In an embodiment of the disclosure, at least a portion of the rear camera region 384 may protrude from the surface of the back plate 380 to a predetermined height. However, the rear camera region 384 is not necessarily limited thereto, and may be formed to be substantially the same plane as the surface of the back plate 380.

Figure 4:
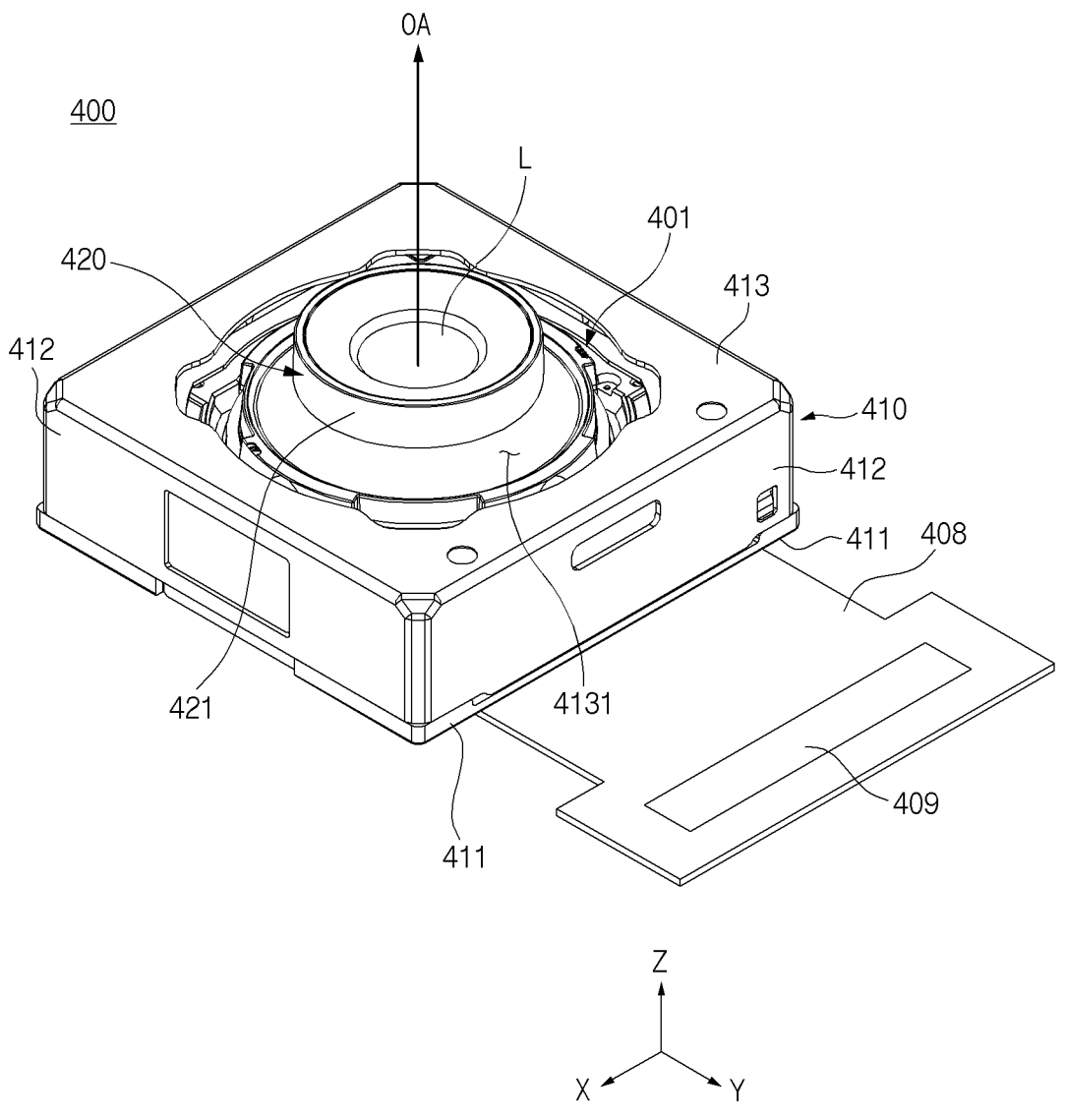
FIG. 4 is a perspective view of a camera module according to an embodiment of the disclosure.

FIG. 4 is a perspective view of the camera module according to an embodiment of the disclosure.

Referring to FIG. 4, a camera module 400 according to an embodiment may include a camera housing 410 and a camera assembly 401 at least partially accommodated in the camera housing 410. In an embodiment of the disclosure, the camera assembly 401 may include a lens assembly 420 (e.g., the lens assembly 210 of FIG. 2). In an embodiment of the disclosure, the camera module 400 may be configured to receive external light through a partial region (e.g., the camera region 306 of FIG. 3C or the rear camera region 384) of a surface of an electronic device (e.g., the electronic device 300 of FIGS. 3A to 3C).

In an embodiment of the disclosure, the camera housing 410 may include a bottom surface 411, a top surface 413, and a side surface 412. An opening 4131 exposing at least a portion of a lens (L) and a lens barrel 421 may be formed in the top surface 413. The opening 4131 may be at least partially aligned with the optical axis (OA) of the lens (L). The side surface 412 may surround an inner space between the bottom surface 411 and the top surface 413.

In various embodiments of the disclosure, on the bottom surface 411 of the camera housing 410, an image sensor (e.g., the image sensor 230 of FIG. 2 or the image sensor 419 of FIG. 5) and a circuit board (e.g., a connection member 408 of FIG. electrically connected to the image sensor 230 or 419 may be disposed. In various embodiments of the disclosure, the image sensor 230 or 419 may be disposed in the camera housing 410 to at least partially align with the optical axis (OA) of the lens (L). For example, the image sensor 230 or 419 may convert an optical signal received through the lens (L) into an electrical signal.

In an embodiment of the disclosure, at least a portion of the lens assembly 420 may be accommodated in the camera housing 410. For example, a portion of the lens assembly 420 may extend to the outside of the camera housing 410 through the opening 4131.

In an embodiment of the disclosure, the lens assembly 420 may include a plurality of lenses L and the lens barrel 421 surrounding the plurality of lenses L. In an embodiment of the disclosure, the lens assembly 420 may be disposed so that at least a portion of the plurality of lenses L and the lens barrel 421 are exposed through the opening 4131 of the camera housing 410.

In an embodiment of the disclosure, the camera module 400 may be electrically connected to the electronic device (e.g., the electronic device 300 of FIGS. 3A to 3C) through the connection member 408. For example, the connection member 408 may include a connector 409 coupled to a printed circuit board (e.g., the printed circuit board 350 of FIG. 3C) of the electronic device 300. In an embodiment of the disclosure, the connection member 408 may include a circuit board that includes a flexible region that is at least partially flexible.

In various embodiments of the disclosure, the connection member 408 may extend from an inner space of the camera housing 410 to the outside of the camera housing 410 (e.g., the printed circuit board 350 of FIG. 3C).

In various embodiments of the disclosure, the connection member 408 may include a region on which the image sensor 230 or 419 is disposed or which is electrically connected to the image sensor 230 or 419. For example, the connection member 408 may include a flexible printed circuit board (FPCB).

Figure 5:
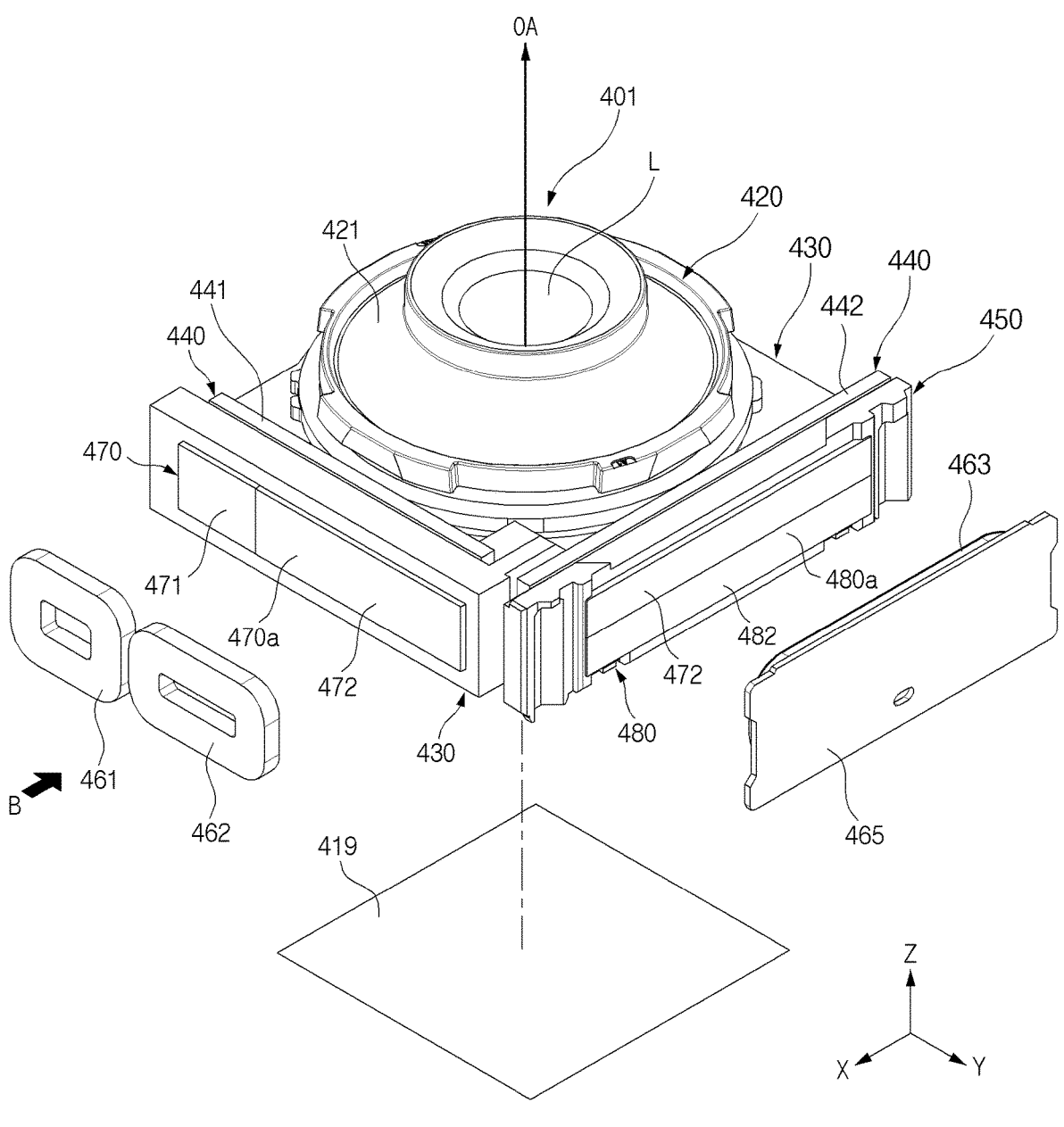
FIG. 5 is a diagram illustrating a camera assembly, an image sensor, and driving units of the camera module according to an embodiment of the disclosure.

FIG. 5 is a diagram illustrating the camera assembly, the image sensor, and driving units of the camera module according to an embodiment of the disclosure.

Figure 6:
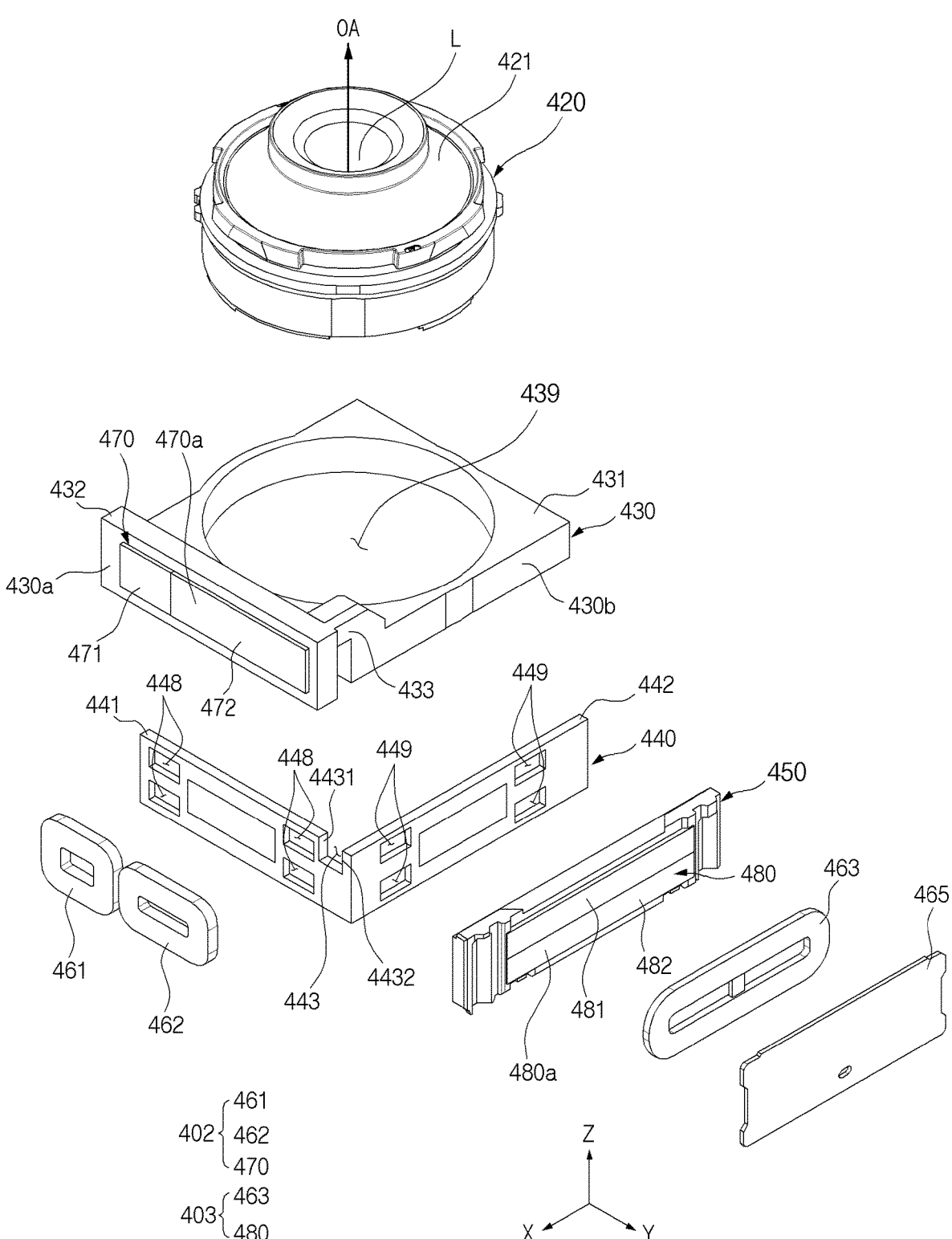
FIG. 6 is an exploded view of the camera assembly, the image sensor, and the driving units of the camera module according to an embodiment of the disclosure.

FIG. 6 is an exploded view of the camera assembly, the image sensor, and the driving units of the camera module according to an embodiment of the disclosure.

Referring to FIGS. 5 and 6, in an embodiment of the disclosure, the camera module 400 may include the camera assembly 401, the image sensor 419, and driving units 402 and 403.

In an embodiment of the disclosure, the image sensor 419 may be disposed to be at least partially aligned with the lens (L) in a direction of the optical axis (OA). The image sensor 419 may be disposed on a bottom surface (e.g., the bottom surface 411 of FIG. 4) of a camera housing (e.g., the camera housing 410 of FIG. 4). The image sensor 419 may be configured to receive light concentrated by the lens (L) and generate an electrical signal based on the received light. In an embodiment of the disclosure, a distance between the image sensor 419 and the lens (L) may vary as the camera assembly 401 moves in the direction of the optical axis (OA).

In an embodiment of the disclosure, the camera assembly 401 may be disposed at least partially in a camera housing (e.g., the camera housing 410 of FIG. 4). The camera assembly 401 may include the lens assembly 420, a first holder 430, a guide structure 440, and a second holder 450.

In an embodiment of the disclosure, the lens assembly 420 may include the lens (L) and the lens barrel 421 surrounding the lens (L). For example, the lens (L) may include a plurality of lenses stacked in the direction of the optical axis (OA). The lenses L may be protected against external impact by being surrounded by the lens barrel 421. The lens assembly 420 may be coupled to the first holder 430. For example, the lens assembly 420 may move in an X-axis, a Y-axis, and/or a Z-axis direction(s) together with the first holder 430. For example, the lens assembly 420 may be at least partially inserted into an opening 439 formed in the first holder 430.

In an embodiment of the disclosure, the first holder 430 may include a body 431 on which the lens assembly 420 is disposed, a side portion 432 on which a first magnet 470 is disposed, and a connecting portion 433 connecting the body 431 and the side portion 432. For example, the opening 439 into which the lens assembly 420 is inserted may be formed in the body 431. For example, the first magnet 470 may be disposed on a first side surface 430a of the side portion 432. In an embodiment of the disclosure, a predetermined space may be formed between the body 431 and the side portion 432. A first portion 441 of the guide structure 440 may be at least partially positioned in the space. For example, the first connecting portion 433 may be positioned at least partially in a first groove 443 formed in the first portion 441 of the guide structure 440.

In an embodiment of the disclosure, when the image stabilization function is performed, the first holder 430 may move along the X-axis (e.g., +X/−X axis) and/or the Y-axis (e.g., +Y/−Y axis) direction(s) together with the lens assembly 420. In an embodiment of the disclosure, when the first holder 430 moves in the Y-axis direction, the guide structure 440 and the second holder 450 may maintain specified positions. For example, the first holder 430 may move in the Y-axis direction while the first connecting portion 433 is positioned in the first groove 443 of the guide structure 440. In an embodiment of the disclosure, when the first holder 430 moves in the X-axis direction, the first holder 430 may move together with the guide structure 440, and the second holder 450 may maintain a specified position. For example, when the first holder 430 moves in the X-axis direction, the guide structure 440 may move together with the first holder 430 such that the first portion 441 of the guide structure 440 is moved away from or closer to the first coil 461 and the second coil 462.

In an embodiment of the disclosure, the guide structure 440 may include the first portion 441 positioned at least partially between the body 431 and the side portion 432 of the first holder 430, and a second portion 442 disposed between the first holder 430 and the second holder 450. The second portion 442 may extend in a substantially perpendicular direction from the first portion 441. For example, the first portion 441 may extend long in the Y-axis direction and the second portion 442 may extend long in the X-axis direction. In an embodiment of the disclosure, the guide structure 440 may be formed in a shape for at least partially surrounding the first holder 430. For example, the guide structure 440 may be formed in an inverted L-shape when viewed in the Z-axis direction. In an embodiment of the disclosure, the first groove 443 may be formed in the first portion 441 of the guide structure 440. The first connecting portion 433 of the first holder 430 may be positioned in the first groove 443. For example, at least a portion of the first connecting portion 433 may be positioned between a first inner wall 4431 and a second inner wall 4432 of the first groove 443. In an embodiment of the disclosure, the first inner wall 4431 and the second inner wall 4432 may face each other in the Y-axis direction. For example, the first holder 430 may move in the Y-axis direction with the first connecting portion 433 positioned between the first inner wall 4431 and the second inner wall 4432. For example, the first inner wall 4431 and the second inner wall 4432 may function as stoppers that limit a movement range of the first holder 430. In an embodiment of the disclosure, the second portion 442 of the guide structure 440 may be disposed between a second side surface 430*b* of the first holder 430 and the second holder 450.

In an embodiment of the disclosure, a first recess 448 in which a first ball (e.g., a first ball 491 of FIG. 8) is accommodated may be formed in the first portion 441 of the guide structure 440. The first ball 491 may provide a rolling friction force between the first holder 430 and the first portion 441 of the guide structure 440 when the first holder 430 moves in the Y-axis direction. For example, when the first holder 430 moves in the Y-axis direction, the first ball 491 may roll at a specified position in the first recess 448 or may roll while moving in the Y-axis direction. In an embodiment of the disclosure, the first recess 448 may extend relatively long in the Y-axis direction as compared to the Z-axis direction, corresponding to a moving direction of the first portion 441 of the guide structure 440.

In an embodiment of the disclosure, a second recess 449 in which a second ball (e.g., a second ball 492 of FIG. 8) is accommodated may be formed in the second portion 442 of the guide structure 440. The second ball 492 may provide a rolling friction force between the second holder 450 and the second portion 442 of the guide structure 440 when the guide structure 440 moves in the X-axis direction. For example, when the second holder 450 moves in the X-axis direction, the second ball 492 may roll at a specified position in the second recess 449 or may roll while moving in the X-axis direction. In an embodiment of the disclosure, the second recess 449 may extend relatively long in the X-axis direction as compared to the Z-axis direction, corresponding to a moving direction of the second portion 442 of the guide structure 440.

In an embodiment of the disclosure, the second holder 450 may be configured to, when an auto focus function is performed, move in a direction substantially parallel to the optical axis (OA) (e.g., the Z-axis direction) together with the first holder 430, the lens assembly 420, and the guide structure 440. In an embodiment of the disclosure, the second holder 450 and the second portion 442 of the guide structure 440 may be coupled to move together in the Z-axis direction. In an embodiment of the disclosure, when the guide structure 440 moves in the Y-axis direction, an interval between the second portion 442 of the guide structure 440 and the second holder 450 in the Y-axis direction may vary. The second holder 450 may not move in the Y-axis direction. In an embodiment of the disclosure, a second magnet 480 may be disposed on the second holder 450. The second magnet 480 may be disposed to at least partially face a third coil 463 disposed on the second inner side surface in the camera housing (e.g., the camera housing 410 of FIG. 4). For example, the second magnet 480 may be disposed on a surface facing the Y-axis direction.

In an embodiment of the disclosure, a first driving unit 402 may be configured to move the first holder 430 and the lens assembly 420 in the X axis and/or the Y axis. For example, when a current is applied to the first coil 461 and/or the second coil 462, the first holder 430 and the lens assembly 420 may be moved by an interaction between a magnetic field formed by the coils 461 and 462 and a magnetic field formed by the first magnet 470.

In an embodiment of the disclosure, the first driving unit 402 may include the first magnet 470, the first coil 461, and the second coil 462. In an embodiment of the disclosure, the first driving unit 402 may be configured to move the first holder 430 in at least two directions substantially perpendicular to the optical axis (OA). The lens assembly 420 is coupled to the first holder 430 and moves together, and in this way, the image stabilization function may be performed.

For example, the first coil 461 may move the first holder 430 in the Y-axis direction through an electromagnetic interaction with the first magnet 470. When a current is applied to the first coil 461 fixed to the camera housing (e.g., the camera housing 410 of FIG. 4), a driving force may act on the first magnet 470 in the Y-axis direction. For example, without moving the guide structure 440, the first holder 430 may move relative to the guide structure 440. For example, the driving force acting in the Y-axis direction may be referred to as a Lorentz force. For example, when viewed in the X-axis direction, the first coil 461 may include a 1-1 region (e.g., a 1-1 region 461-1 of FIG. 7) overlapping a first polarity region 471 and a 1-2 region (e.g., a 1-2 region 461-2 of FIG. 7) overlapping a second polarity region 472. For example, a current may flow in the +Z-axis direction in the 1-1 region 461-1, and a current may flow in the −Z-axis direction in the 1-2 region 461-2. The first polarity region 471 may form a magnetic field in the +X-axis direction, and the second polarity region 472 may form a magnetic field in the −X-axis direction. Referring to Fleming's left-hand rule, in the first magnet 470, a Lorentz force may act on the fixed first coil 461 in the +Y/−Y-axis direction. In an embodiment of the disclosure, the first magnet 470 and the first coil 461 may be referred to as a Lorentz type actuator.

In an embodiment of the disclosure, the first coil 461 may be disposed in the camera housing (e.g., the camera housing 410 of FIG. 4). For example, the first coil 461 may be disposed on a first inner side surface of the camera housing (e.g., the camera housing 410 of FIG. 4). The first inner side surface may include a region facing the first side surface 430*a* of the first holder 430 in the X-axis direction. In an embodiment of the disclosure, the first coil 461 may be disposed at a position adjacent to the second coil 462. The first coil 461 may be fixed to the camera housing (e.g., the camera housing 410 of FIG. 4) regardless of the movement of the lens assembly 420 and the first holder 430. The first coil 461 may at least partially face each of the first polarity region 471 and the second polarity region 472 of the first magnet 470 when viewed in the X-axis direction. For example, when viewed in the X-axis direction, a portion of the first coil 461 may overlap the first polarity region 471 and another portion of the first coil may overlap the second polarity region 472.

In an embodiment of the disclosure, the first coil 461 may be configured to apply a driving force to the first magnet 470 in the Y-axis direction. For example, when a current is applied to the first coil 461, the driving force acts on the first magnet 470 in the Y-axis direction, and accordingly, the first holder 430 in which the first magnet 470 is fixedly disposed may move in the Y-axis direction. For example, without moving the guide structure 440 and the second holder 450, the first holder 430 may move relative to the guide structure 440. In an embodiment of the disclosure, the first coil 461 may interact with each of the first polarity region 471 and the second polarity region 472 of the first magnet 470. When the first holder 430 moves in the Y-axis direction, a distance between the first coil 461 and the first magnet 470 in the X-axis direction may be maintained constant.

For example, the second coil 462 may move the first holder 430 in the X-axis direction through an electromagnetic interaction with the first magnet 470. When a current is applied to the second coil 462 fixed to the camera housing (e.g., the camera housing 410 of FIG. 4), a driving force may act on the first magnet 470 in the X-axis direction. For example, the guide structure 440 may move together with the first holder 430. For example, the driving force in the X-axis direction may include an attractive force in a direction (e.g., the +X-axis direction) in which the first magnet 470 approaches the second coil 462 or a repulsive force in a direction (e.g., –X-axis direction) in which the first magnet 470 moves away from the second coil 462. According to Ampere's right-hand rule, the direction (e.g., the +X/–X-axis direction) of the magnetic field formed by the second coil 462 may vary according to the current direction. For example, when the direction of the magnetic field formed by the second coil 462 is the same as the direction of the magnetic field formed by the second polarity region, a repulsive force may be generated between the second coil 462 and the first magnet 470. When the direction of the magnetic field formed by the second coil 462 is opposite to the direction of the magnetic field formed by the second polarity region 472, an attractive force may be generated between the second coil 462 and the first magnet 470. In an embodiment of the disclosure, the first magnet 470 and the second coil 462 may be referred to as a solenoid type actuator.

In an embodiment of the disclosure, the second coil 462 may be disposed in the camera housing (e.g., the camera housing 410 of FIG. 4). For example, the second coil 462 may be disposed on the first inner side surface of the camera housing (e.g., the camera housing 410 of FIG. 4). In an embodiment of the disclosure, the second coil 462 may be disposed at a position adjacent to the first coil 461. The first inner side surface may include the region facing the first side surface 430a of the first holder 430 in the X-axis direction. The second coil 462 may be fixed to the camera housing (e.g., the camera housing 410 of FIG. 4) regardless of the movement of the lens assembly 420 and the first holder 430. The second coil 462 may at least partially face the second polarity region 472 of the first magnet 470 when viewed in the X-axis direction. For example, when viewed in the X-axis direction, the second coil 462 may overlap the second polarity region 472 of the first magnet 470.

In an embodiment of the disclosure, the second coil 462 may be configured to apply a driving force to the first magnet 470 in the X-axis direction. For example, when a current is applied to the second coil 462, the driving force acts on the first magnet 470 in the X-axis direction, and accordingly, the first holder 430 in which the first magnet 470 is fixedly disposed may move in the X-axis direction. For example, the guide structure 440 may move in the X-axis direction together with the first holder 430, the second holder 450 may not move, and the guide structure 440 and the first holder 430 may move relative to the second holder 450. In an embodiment of the disclosure, the second coil 462 may interact with the second polarity region 472 of the first magnet 470. For example, an attractive force or a repulsive force may act between the second coil 462 and the second polarity region 472. When the first holder 430 and the guide structure 440 move in the X-axis direction, the distance between the first coil 461 and the first magnet 470 in the X-axis direction may vary.

In an embodiment of the disclosure, the first magnet 470 may be disposed on the side portion 432 of the first holder 430. For example, the first magnet 470 may be disposed on the first side surface 430a of the first holder 430. The first magnet 470 may be disposed to at least partially face each of the first coil 461 and the second coil 462 in the X-axis direction. The first magnet 470 may be configured so that a first facing surface 470a facing the first coil 461 and the second coil 462 includes at least two regions having different polarities. For example, the first facing surface 470a of the first magnet 470 may include an N-pole region and an S-pole region.

In an embodiment of the disclosure, the first magnet 470 may include the first polarity region 471 having a first polarity and the second polarity region 472 having a second polarity. The first polarity region 471 and the second polarity region 472 may be arranged in the Y-axis direction. For example, the first polarity region 471 may be positioned in the Y-axis direction from the second polarity region 472. In an embodiment of the disclosure, the first polarity region 471 and the second polarity region 472 may have different areas. For example, referring to the drawings, the first polarity region 471 may have a smaller area than the second polarity region 472. In an embodiment of the disclosure, a portion of the first polarity region 471 and a portion of the second polarity region 472 may face the first coil 461 in the X-axis direction. For example, each of the first polarity region 471 and the second polarity region 472 of the first magnet 470 may electromagnetically interact with the first coil 461. In an embodiment of the disclosure, the second polarity region 472 may face the second coil 462 in the X-axis direction. For example, the second polarity region 472 of the first magnet 470 may electromagnetically interact with the second coil 462.

However, the first coil 461 and the second coil 462 are not limited to being disposed in the camera housing (e.g., the camera housing 410 of FIG. 4), and the first magnet 470 is not limited to being disposed in the first holder 430. For example, according to various embodiments of the disclosure, the first coil 461 and the second coil 462 may be disposed on the first side surface 430a of the first holder 430, and the first magnet 470 may be disposed on the first inner side surface of the camera housing. (e.g., the camera housing 410 of FIG. 4).

In an embodiment of the disclosure, the second driving unit 403 may include the third coil 463 and the second magnet 480. In an embodiment of the disclosure, the second driving unit 403 may be configured to move the first holder 430, the second holder 450, and the guide structure 440 in a direction substantially parallel to the optical axis (OA). The lens (L) may be coupled to the first holder 430 and move together, and the distance between the image sensor 419 fixedly disposed on the bottom surface of the camera housing (e.g., the camera housing 410 of FIG. 4) and the lens (L) may vary. In this way, the auto focus function may be performed.

For example, the third coil 463 may move the first holder 430, the second holder 450, and the guide structure 440 in the Z-axis direction through electromagnetic interaction with the second magnet 480. When a current is applied to the third coil 463 fixedly disposed in the camera housing (e.g., the camera housing 410 of FIG. 4), a driving force may act in the Z-axis direction on the second magnet 480 disposed on the second holder 450.

In an embodiment of the disclosure, the third coil 463 may be disposed in the camera housing (e.g., the camera housing 410 of FIG. 4). For example, the third coil 463 may be disposed on the second inner side surface of the camera housing (e.g., the camera housing 410 of FIG. 4). The second inner side surface may include a region facing the second holder 450 in the X-axis direction. In an embodiment of the disclosure, the third coil 463 may be fixed to the camera housing (e.g., the camera housing 410 of FIG. 4) regardless of the movement of the lens assembly 420, the first holder 430, the guide structure 440, and the second holder 450. The third coil 463 may at least partially face each of a first polarity region 481 and a second polarity region 482 of the second magnet 480 when viewed in the Y-axis direction. For example, when viewed in the X-axis direction, a portion of the third coil 463 may overlap the first polarity region 481 and another portion of the third coil 463 may overlap the second polarity region 482.

In an embodiment of the disclosure, the second magnet 480 may be disposed on the second holder 450. The second magnet 480 may be disposed to at least partially face the third coil 463 in the Y-axis direction. The second magnet 480 may be configured so that a third facing surface 480a facing the third coil 463 includes at least two regions having different polarities. For example, the third facing surface 480a of the second magnet 480 may include an N-pole region and an S-pole region.

In an embodiment of the disclosure, the second magnet 480 may include the first polarity region 481 having a first polarity and the second polarity region 482 having a second polarity. The first polarity region 481 and the second polarity region 482 may be arranged in the Z-axis direction. For example, the first polarity region 481 may be positioned in the Z-axis direction from the second polarity region 482. In an embodiment of the disclosure, a portion of the first polarity region 481 and a portion of the second polarity region 482 may face the third coil 463 in the Y-axis direction. For example, each of the first polarity region 481 and the second polarity region 482 of the second magnet 480 may electromagnetically interact with the third coil 463. For example, the driving force applied to the second magnet 480 may be referred to as a Lorentz force. For example, when viewed in the Y-axis direction, the second magnet 480 may overlap each of the first polarity region 481 and the second polarity region 482, and currents in opposite directions may flow. The first polarity region 481 and the second polarity region 482 may form magnetic fields in opposite directions. Referring to Fleming's left-hand rule, in the second magnet 480, a Lorentz force may act on the fixed third coil 463 in the +Z/−Z-axis direction. In an embodiment of the disclosure, the second magnet 480 and the third coil 463 may be referred to as a Lorentz type actuator.

In an embodiment of the disclosure, a yoke member 465 may be disposed on the third coil 463. The yoke member 465 may reduce leakage of the magnetic field(s) generated by the third coil 463 and/or the second magnet 480 to the outside of the camera module 400.

Figure 7:
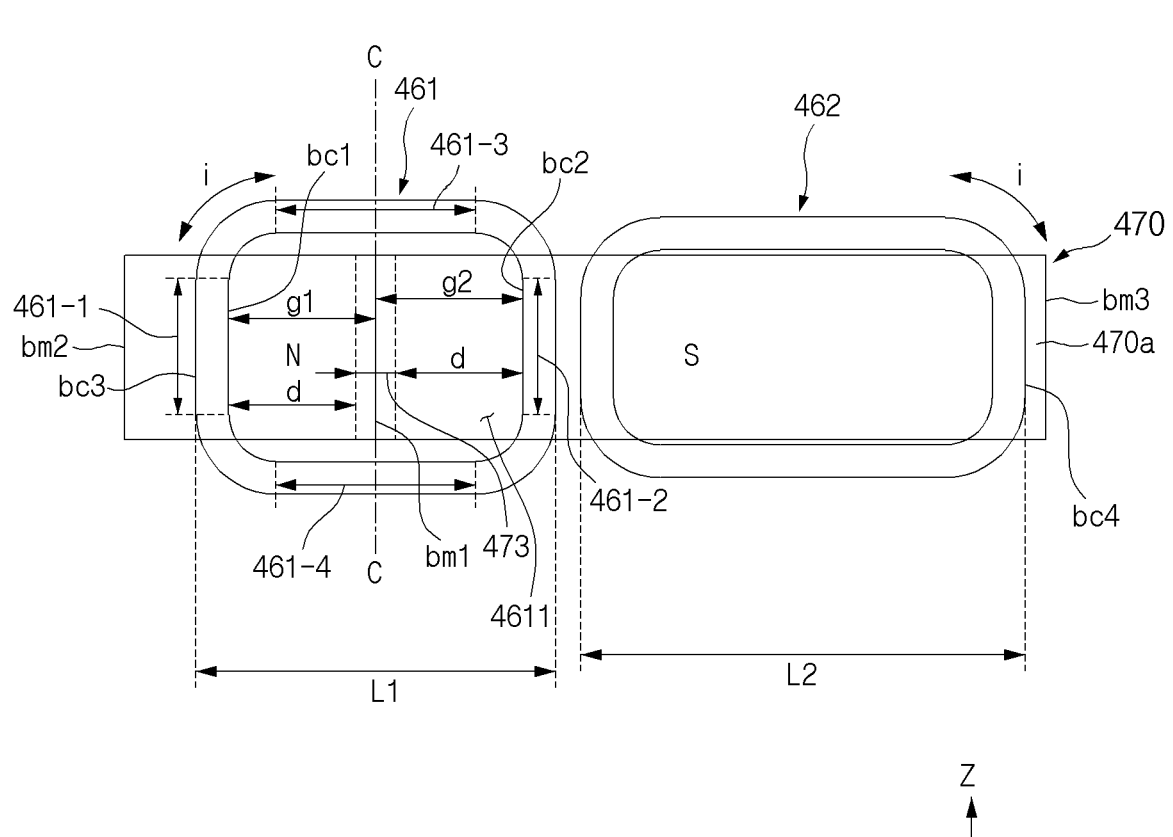
FIG. 7 is a diagram illustrating a first magnet, a first coil, and a second coil of the camera module according to an embodiment of the disclosure.

FIG. 7 is a diagram illustrating a first magnet, a first coil, and a second coil of a camera module according to an embodiment of the disclosure. FIG. 7 is a diagram when viewed from a direction B shown in FIG. 5.

Referring to FIG. 7, the first magnet 470 may be disposed to at least partially overlap the first coil 461 and the second coil 462 when viewed in the X-axis direction. The first facing surface 470a facing each of the first coil 461 and the second coil 462 may be defined in the first magnet 470. The first facing surface 470a may include the N-pole region having an N pole and the S-pole region having an S pole. A first boundary line bm1 for separating the N-pole region and the S-pole region may be defined on the first facing surface 470a. Positions of the N-pole region and the S-pole region shown in FIG. 7 may vary. The N-pole region and the S-pole region may be arranged in the Y-axis direction. In an embodiment of the disclosure, when viewed in the X-axis direction, a portion of the first coil 461 may overlap the N-pole region of the first magnet 470, and another portion of the first coil 461 and the second coil 462 may overlap the S-pole region thereof. In an embodiment of the disclosure, a driving force may be applied to the first magnet 470 in the Y-axis direction by the first coil 461, and a driving force may be applied thereto in the X-axis direction by the second coil 462.

In an embodiment of the disclosure, the first coil 461 may include the 1-1 region 461-1 and the 1-2 region 461-2 extending long in the Z-axis direction, and a 1-3 region 461-3 and a 1-4 region 461-4 extending long in the Y-axis direction. In an embodiment of the disclosure, a current i may flow in the first coil 461 in a clockwise or counter-clockwise direction. A magnetic field is formed by the current, and the magnetic field may interact with the magnetic field of the first magnet 470 to form an electromagnetic force in the Y-axis direction. For example, referring to the drawing, currents in opposite directions may flow in the 1-1 region 461-1 and the 1-2 region 461-2. Referring to the drawing, currents in opposite directions may flow in the 1-3 region 461-3 and the 1-4 region 461-4.

In an embodiment of the disclosure, each of the 1-1 region 461-1 and the 1-2 region 461-2 of the first coil 461 may form a driving force in the Y-axis direction. In an embodiment of the disclosure, the first coil 461 may be disposed so that the 1-1 region 461-1 at least partially overlaps the N-pole region, and the 1-2 region 461-2 at least partially overlaps the S-pole region. For example, since current flows in opposite directions to the 1-1 region 461-1 and the 1-2 region 461-2, the 1-1 region 461-1 and the 1-2 region 461-2 may be disposed to overlap regions of different polarities. Thus, the 1-1 region 461-1 and the 1-2 region 461-2 may form driving forces acting in the same direction. A net driving force formed by the first coil 461 may be mainly formed by the 1-1 region 461-1 and the 1-2 region 461-2.

In an embodiment of the disclosure, a portion of the 1-3 region 461-3 of the first coil 461 and another portion thereof form driving forces in opposite directions, so that respective driving forces may be offset. For example, the net driving force formed by the 1-3 region 461-3 may be substantially zero. In an embodiment of the disclosure, a portion of the 1-4 region 461-4 of the first coil 461 and another portion thereof form driving forces in opposite directions, so that respective driving forces may be offset. For example, the net force formed by the 1-4 region 461-4 may be substantially zero.

In an embodiment of the disclosure, the camera module 400 may include a first Hall sensor (not illustrated) and a second Hall sensor (not illustrated) for detecting the position of the first magnet 470. For example, the first Hall sensor may be adjacent to the first coil 461 and the second Hall sensor may be adjacent to the second coil 462.

For example, the camera module 400 may detect the position of the first magnet 470 in the Y-axis direction based on signals detected from each of the first Hall sensor and the second Hall sensor. For example, when the camera module 400 detects the position in the Y-axis direction using only the first Hall sensor, an error may occur in the detected position of the first magnet 470. For example, movement of the first magnet 470 in the X-axis direction changes the distance between the first Hall sensor and the first magnet 470, which may affect the first Hall sensor. In other words, a detection signal of the first Hall sensor may be affected by the position of the first magnet 470 in the X-axis direction as well as the position of the first magnet 470 in the Y-axis direction. Therefore, the camera module 400 may detect the position of the first magnet 470 in the Y-axis direction based on a corrected third signal based on a first signal detected from the first Hall sensor and a second signal detected from the second Hall sensor. For example, the third signal may be obtained as follows:

$$\text{The third signal} = \frac{(\text{the first signal} + \text{the second signal})}{(\text{the first signal} - \text{the second signal})}$$

For example, the camera module 400 may detect the position of the first magnet 470 in the X-axis direction based on the signal detected from the second Hall sensor. For example, when the signal sensed by the second Hall sensor decreases, the camera module 400 may determine that the first magnet 470 moves in a direction away from the second coil 462. Since the movement of the first magnet 470 in the Y-axis direction does not change the distance between the second Hall sensor and the first magnet 470, the movement may not substantially affect the signal of the second Hall sensor. Accordingly, the camera module 400 may detect the position of the first magnet 470 in the X-axis direction using only the second Hall sensor.

In an embodiment of the disclosure, the first coil 461 may be disposed such that an inner boundary line parallel to the Z-axis direction is spaced apart from a boundary line of the first magnet 470 by a predetermined interval. For example, a first inner boundary line bc1 included in the 1-1 region 461-1 may be spaced apart from the first boundary line bm1 of the first magnet 470 in the −Y-axis direction by a first interval g1. A second inner boundary line bc2 included in the 1-2 region may be spaced apart from the first boundary line bm1 of the first magnet 470 in the Y-axis direction by a second interval g2.

In an embodiment of the disclosure, the first interval g1 and the second interval g2 may be greater than a maximum movement distance (e.g., a movement distance d of FIG. 10) that the first holder 430 is able to maximally move in the Y-axis or −Y-axis from a basic state (e.g., a state in which the image stabilization function is not performed). For example, a neutral region 473 including the first boundary line bm1 may be defined in the first magnet 470. The first coil 461 may be disposed so that the first inner boundary line bc1 and the second inner boundary line bc2 are spaced apart from the neutral region 473 by at least a maximum movement distance d of the first holder 430 in the +Y-axis direction and a maximum movement direction d of the first holder 430 in the −Y-axis direction, respectively.

For example, when the image stabilization function of the camera module 400 is performed, the first holder 430 and the first magnet 470 may move by the maximum movement distance d in the Y-axis or −Y-axis direction from the basic state. When the first coil 461 overlaps only either the N-pole region or the S-pole region in a state in which the first magnet 470 moves by the maximum movement distance d, an attraction or a repulsive force in the X-axis direction is formed between the first coil 461 and the first magnet 470, and thus the first magnet 470 may not be driven in the Y-axis direction. Therefore, according to an embodiment of the disclosure, even when the first magnet 470 moves in the Y-axis direction, the first coil 461 and the first magnet 470 may be disposed so that the first coil 461 maintains the overlap with each of the N-pole region and the S-pole region.

In an embodiment of the disclosure, the first coil 461 may be formed so that the current i flows in a rotational direction around an arbitrary axis substantially parallel to the X-axis direction. For example, the first coil 461 may include a wound conductive wire or a printed conductive pattern around an arbitrary axis substantially parallel to the X axis.

In an embodiment of the disclosure, an opening region 4611 surrounded by the conductive wire or the pattern may be defined in the first coil 461. The first coil 461 may be disposed so that the first boundary line bm1 or the neutral region 473 of the first magnet 470 is included in the opening region 4611. For example, even when the first magnet 470 moves by the maximum movement distance d in the Y-axis direction, the first boundary line bm1 or the neutral region 473 of the first magnet 470 may be positioned in the opening region 4611.

In an embodiment of the disclosure, in the basic state, the first coil 461 may be disposed so that a center line c of the first coil 461 and the first boundary line bm1 of the first magnet 470 overlap each other when viewed in the X-axis direction. The center line c of the first coil 461 may be a line substantially parallel to the first inner boundary line bc1 and the second inner boundary line bc2 and spaced apart from them by the same distance. In an embodiment of the disclosure, in a basic state, the center line c of the first coil 461 may overlap the neutral region 473 of the first magnet 470 when viewed in the X-axis direction.

In various embodiments of the disclosure, a second boundary line bm2 of the first magnet 470 may further extend from a third outer boundary line bc3 of the first coil 461 by a predetermined length. The predetermined length may be greater than or equal to the maximum movement distance d of the lens assembly. For example, referring to the drawing, even when the first magnet 470 moves by the maximum movement distance d in the −Y-axis direction, the 1-1 region 461-1 of the first coil 461 may maintain the overlap with this N-pole region.

In various embodiments of the disclosure, when viewed in the X-axis direction, a third boundary line bm3 of the first magnet 470 may further extend from a fourth outer boundary line bc4 of the second coil 462 by a predetermined length. The predetermined length may be greater than or equal to the maximum movement distance d. For example, referring to the drawing, even when the first magnet 470 moves by the maximum movement distance d in the Y-axis direction, an overlapped area between the second coil 462 and the S-pole region of the first magnet 470 may be maintained constant. In this way, regardless of the displacement of the first magnet 470 in the Y-axis, the second coil 462 may provide a substantially uniform driving force in the X-axis direction.

In an embodiment of the disclosure, the second coil 462 may be formed so that the current i flows in a rotational direction around an arbitrary axis parallel to the X-axis direction. For example, the second coil 462 may include a wound conductive wire or a printed conductive pattern around an arbitrary axis substantially parallel to the X axis.

In another embodiment of the disclosure, the second coil 462 may extend longer in the Y-axis than the first coil 461. For example, the first coil 461 may have a first length L1 measured in the Y-axis direction, and the second coil 462 may have a second length L2 measured in the Y-axis direction. The second length L2 may be greater than the first length L1. For example, the 1-3 region 461-3 and the 1-4 region 461-4, which do not affect the net driving force in the Y-axis direction, may have a length shorter than an extension length of the second coil 462 in the Y-axis direction.

In another embodiment of the disclosure, the area of the N-pole region may be greater than that of the S-pole region. For example, the N-pole region may extend longer in the Y-axis direction than the second length L2 of the second coil 462 in the Y-axis direction.

In various embodiments of the disclosure, the N-pole region and the S-pole region may be arranged in the Y-axis direction. Areas of the N-pole region and the S-pole region may be different. For example, an extension length of the N-pole region in the Y-axis direction and an extension length of the S-pole region in the Y-axis direction may be different. For example, referring to the drawings, the S-pole region may extend longer in the Y-axis direction than the N-pole region.

In various embodiments of the disclosure, a difference between the extension length of the N-pole region in the Y-axis direction and the extension length of the S-pole region in the Y-axis direction may be greater than or equal to a displacement by which the lens assembly (e.g., the lens assembly 420 of FIG. 6) is able to move in the Y-axis direction.

In various embodiments of the disclosure, a distance (e.g., $g1+g2$) of the first coil 461 measured in the Y-axis direction between the 1-1 region 461-1 and the 1-2 region 461-2 may be greater than or equal to a displacement (e.g., $2d$) by which the lens assembly (e.g., the lens assembly 420 of FIG. 6) is able to move in the Y-axis direction.

Figure 8:
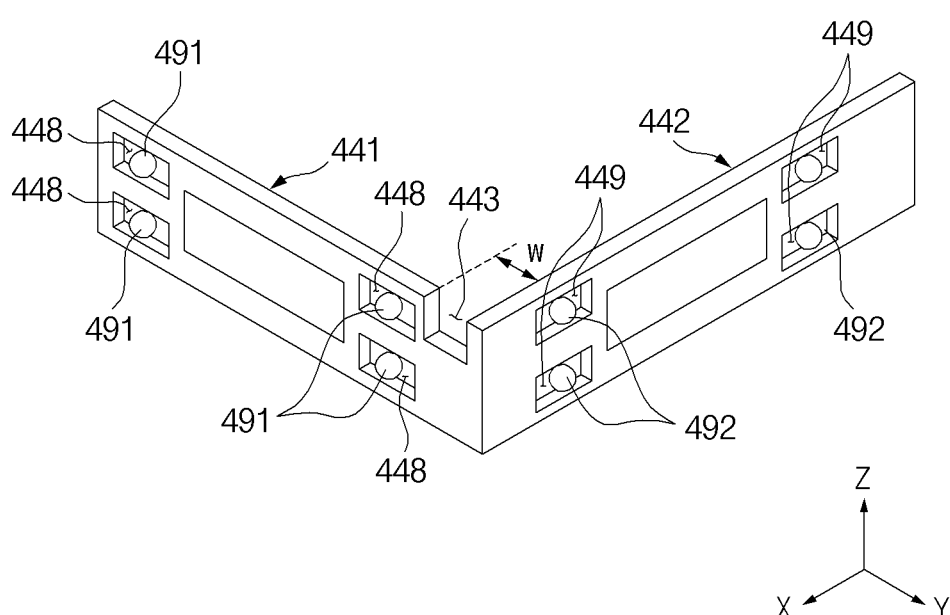
FIG. 8 is a diagram illustrating a guide structure of the camera module according to an embodiment of the disclosure.

FIG. 8 is a diagram illustrating a guide structure of a camera module according to an embodiment of the disclosure.

Figure 9A:
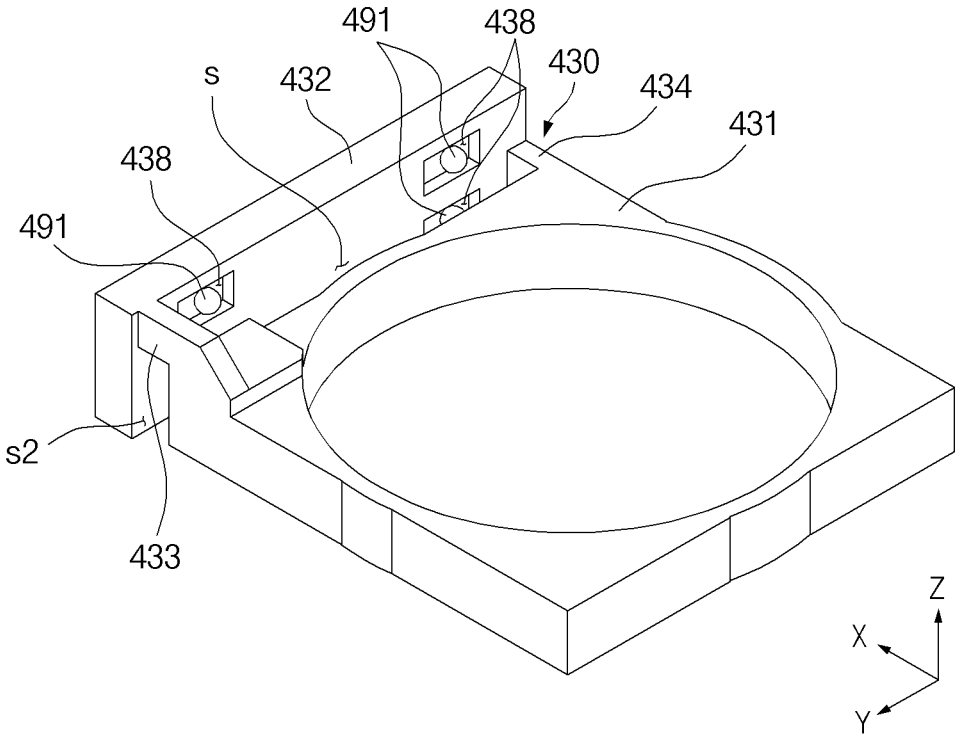
FIGS. 9A and 9B are diagrams illustrating a guide structure, a first holder, and a second holder of the camera module according to various embodiments of the disclosure.
Figure 9B:
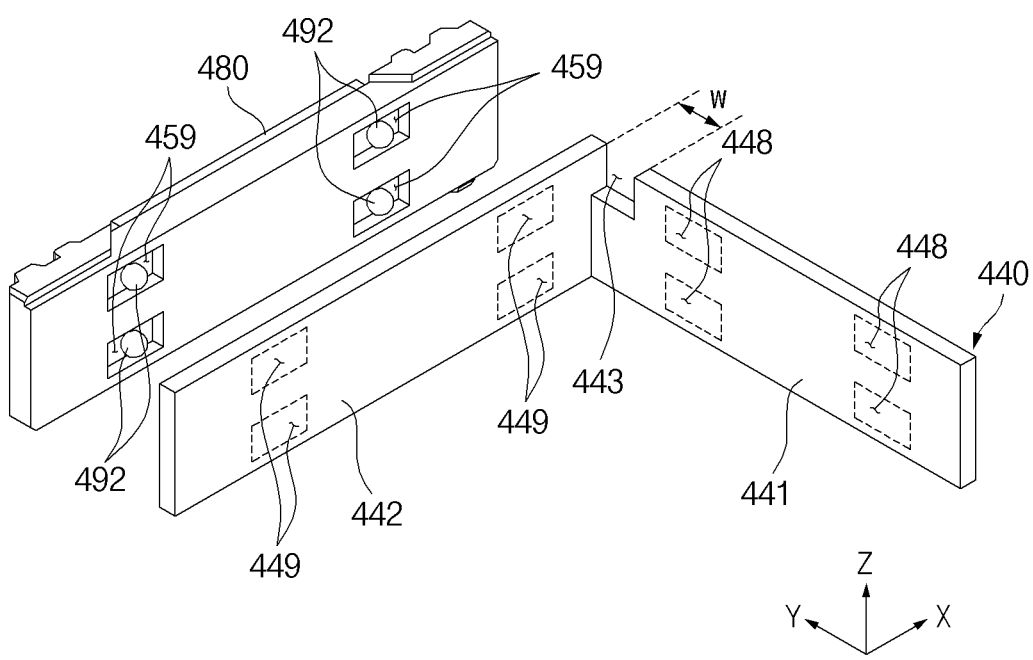

FIGS. 9A and 9B are diagrams illustrating a guide structure, a first holder, and a second holder of a camera module according to various embodiments of the disclosure.

Referring to FIGS. 8, 9A, and 9B, in an embodiment of the disclosure, structures of the camera assembly (e.g., the camera assembly 401 of FIG. 5) may be configured to have degrees of freedom in different directions. For example, the first holder 430 may move in the X-axis, Y-axis, and Z-axis directions. For example, the guide structure 440 may move in the X-axis and Z-axis directions, and may be fixed in the Y-axis direction. For example, the second holder 450 may move in the Z-axis direction and may be fixed in the X-axis and Y-axis directions.

In an embodiment of the disclosure, when the image stabilization operation is performed, any one of the first holder 430, the guide structure 440, and the second holder 450 may be configured to move relative to the structure coupled thereto. For example, when the first holder 430 moves in the Y-axis direction, a frictional force may be generated between the moving first holder 430 and the fixed guide structure 440. For example, when the first holder 430 and the guide structure 440 move in the X-axis direction, a frictional force may be generated between the moving first holder 430 and the guide structure 440 and the fixed second holder 450.

The camera module 400 according to an embodiment may include a ball guide structure to provide smooth movement of each of the structures by reducing the frictional force. For example, the ball guide structure may include the first ball 491 providing a rolling friction force between the first holder 430 and the guide structure 440 and a second ball 492 providing a rolling friction force between the second holder 450 and the guide structure.

Referring to FIG. 8, the guide structure 440 may include the first portion 441 and the second portion 442. The first portion 441 and the second portion 442 may extend in directions substantially perpendicular to each other.

Referring to FIGS. 8, 9A, and 9B, the first portion 441 may be positioned in a space between the side portion 432 of the first holder 430 and the body 431. The first groove 443 may be formed in the first portion 441. The first groove 443 may have an open shape in the +Z-axis direction. A width w of the first groove 443 may be related to a movement range of the first holder 430 in the Y-axis direction. In an embodiment of the disclosure, the first recess 448 in which at least a portion of the first ball 491 is accommodated may be formed in the first portion 441. In various embodiments of the disclosure, a plurality of first recesses 448 may be formed.

Referring to FIGS. 9A and 9B, the side portion 432 of the first holder 430 and the body 431 of the first holder 430 may be connected by the first connecting portion 433 and the second connecting portion 434. A space S may be formed between the side portion 432 and the body 431, and the first portion 441 of the guide structure 440 may be at least partially disposed in the space S. The first connecting portion 433 may be positioned in the first groove 443 of the guide structure 440. In an embodiment of the disclosure, a third recess 438 in which at least a portion of the first ball 491 is accommodated may be formed in the side portion 432 of the first holder 430. In various embodiments of the disclosure, a plurality of third recesses 438 may be formed to correspond to the number of first recesses 448. In an embodiment of the disclosure, the third recess 438 may at least partially face the first recess 448. For example, the third recess 438 and the first recess 448 may at least partially overlap each other when viewed in the X-axis direction.

Referring to FIGS. 9A and 9B, the first connecting portion 433 may be formed to have a shape in which the space is partially opened (S2) in the Y-axis direction. The first portion 441 of the guide structure 440 may extend in the Y-axis direction through the open portion S2.

In an embodiment of the disclosure, the first ball 491 may be disposed at least partially in a space formed by the first recess 448 and the third recess 438. A plurality of first balls 491 may be formed to correspond to the number of first recesses 448 and third recesses 438. In various embodiments of the disclosure, two or more first balls 491 may be disposed in one first recess 448 or one third recess 438. In an embodiment of the disclosure, the first ball 491 may provide a rolling friction force between the guide structure 440 and the first holder 430 when the first holder 430 moves in the Y-axis direction relative to the guide structure 440. In an embodiment of the disclosure, the first ball 491 may be configured to roll in the first recess 448 and the third recess 438. The first ball 491 may roll at a fixed position or roll while moving in the Y-axis direction. In an embodiment of the disclosure, when the first holder 430 and the guide structure 440 move together in the X-axis direction, the first ball 491 may move in the X-axis direction while being disposed between the first holder 430 and the guide structure 440 without rolling.

Referring to FIGS. 8, 9A, and 9B, the second portion 442 may be disposed between the first holder 430 and the second holder 450. In an embodiment of the disclosure, the second recess 449 in which at least a portion of the second ball 492 is accommodated may be formed in the second portion 442. In various embodiments of the disclosure, a plurality of second recesses 449 may be formed.

Referring to FIGS. 9A and 9B, the second magnet 480 may be disposed on a side surface of the second holder 450 facing the +Y-axis direction. The second magnet 480 may be configured to interact with the third coil (e.g., the third coil 463 of FIG. 5) disposed to be fixed to the camera housing (e.g., the camera housing 410 of FIG. 4). In an embodiment of the disclosure, a fourth recess 459 for accommodating at least a portion of the second ball 492 may be formed on a side surface of the second holder 450 facing the −Y-axis direction. In various embodiments of the disclosure, a plurality of fourth recesses 459 may be formed to correspond to the number of second recesses 449. In an embodiment of the disclosure, the fourth recess 459 may at least partially face the second recess 449. For example, the fourth recess 459 and the second recess 449 may at least partially overlap each other when viewed in the Y-axis direction.

In an embodiment of the disclosure, the second ball 492 may be disposed in a space formed by the second recess 449 and the fourth recess 459. A plurality of second balls 492 may be formed to correspond to the number of second recesses 449 and fourth recesses 459. In various embodiments of the disclosure, two or more second balls 492 may be disposed in one second recess 449 or one fourth recess 459. In an embodiment of the disclosure, the second ball 492 may provide a rolling friction force between the guide structure 440 and the second holder 450 when the first holder 430 and the guide structure 440 move in the X-axis direction relative to the second holder 450. In an embodiment of the disclosure, the second ball 492 may be configured to roll in the second recess 449 and the fourth recess 459. The second ball 492 may roll at a fixed position or roll while moving in the X-axis direction. In an embodiment of the disclosure, when the second holder 450, the guide structure 440, and the first holder 430 move together in the Z-axis direction, the second ball 492 may move in the Z-axis direction while being disposed between the second holder 450 and the guide structure 440 without rolling.

In an embodiment of the disclosure, the camera module 400 may be coupled so that the first portion 441 of the guide structure 440 is positioned in the space S between the side portion 432 of the first holder 430 and the body 431, the first connecting portion 433 of the first holder 430 is at least partially positioned in the first groove 443 of the first portion 441 of the guide structure 440, and the second portion 442 of the guide structure 440 is positioned between the first holder 430 and the second holder 450. In an embodiment of the disclosure, the first ball 491 may be disposed between the first portion 441 of the guide structure 440 and the side portion 432 of the first holder 430, and the second ball 492 may be disposed between the second portion 442 of the guide structure 440 and the second holder 450.

In various embodiments of the disclosure, the first recess 448 and the third recess 438 may extend longer in the Y-axis direction than in the Z-axis direction. The first ball 491 may be configured to transmit a driving force in the Z-axis direction to the first holder 430 without rolling when the guide structure 440 moves in the Z-axis direction. In various embodiments of the disclosure, the second recess 449 and the fourth recess 459 may extend longer in the X-axis direction than in the Z-axis direction. The second ball 492 may be configured to transmit a driving force in the Z-axis direction to the guide structure 440 without rolling when the second holder 450 moves in the Z-axis direction. In various embodiments of the disclosure, the driving force acting on the second holder 450 in the Z-axis direction may be transmitted to the first holder 430 and the lens assembly 420 through the guide structure 440.

Figure 10:
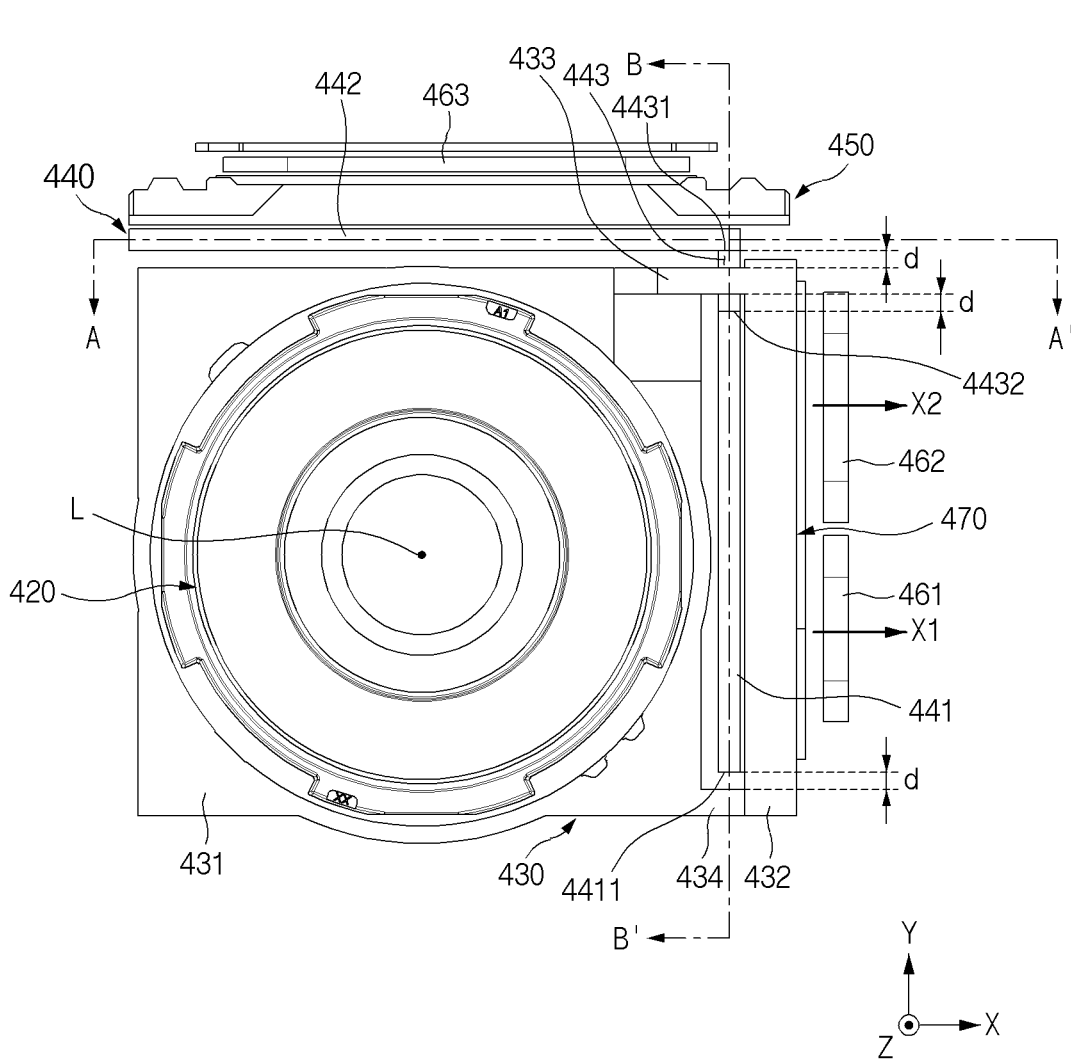
FIG. 10 is a plan view of the camera module according to an embodiment of the disclosure.

FIG. 10 is a plan view of a camera module according to an embodiment of the disclosure.

Figure 11:
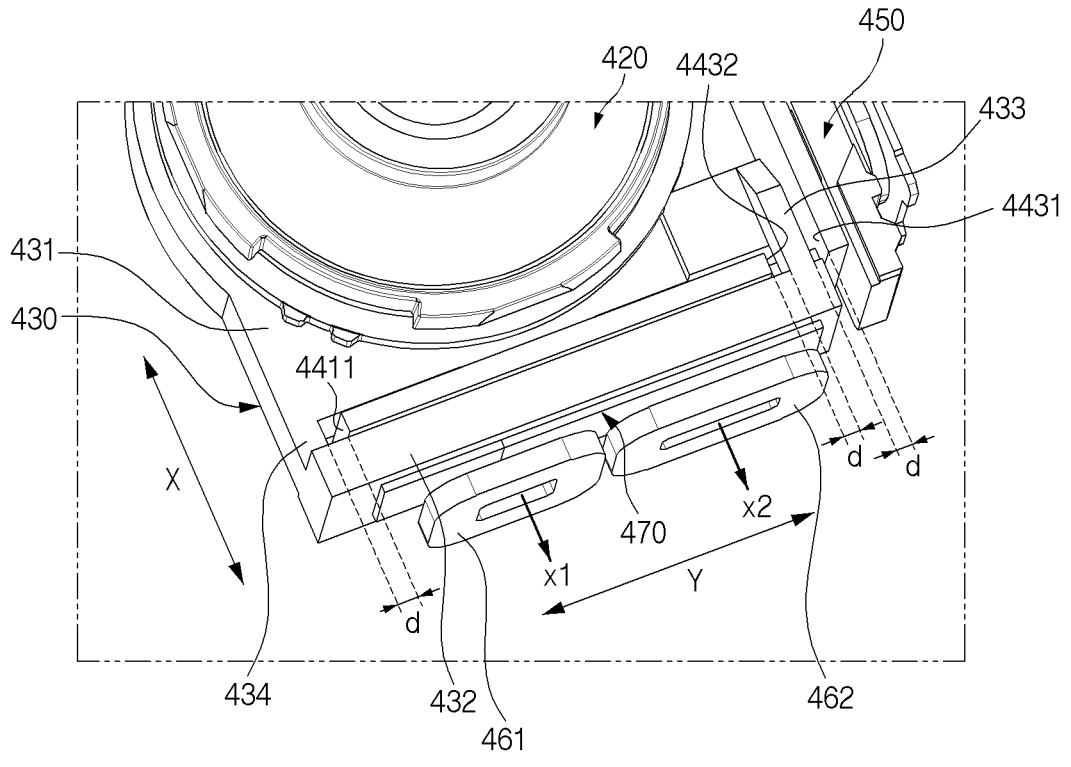
FIG. 11 is a diagram illustrating the camera module according to an embodiment of the disclosure.

FIG. 11 is a diagram illustrating a camera module according to an embodiment of the disclosure.

Referring to FIGS. 10 and 11, in an embodiment of the disclosure, the camera module 400 may perform the image stabilization function to reduce image quality deterioration that may be caused by vibration (e.g., hand shaking) or impact. The image stabilization function may be performed by moving the lens assembly 420 and the first holder 430 in a first direction (e.g., the Y-axis direction) and/or in a second direction perpendicular to the first direction (e.g., the X-axis direction). The first direction and the second direction may be directions perpendicular to the optical axis.

In an embodiment of the disclosure, the camera module 400 may be configured to perform a first image stabilization operation of moving the lens assembly 420 in the first direction and a second image stabilization operation of moving the lens assembly 420 in the second direction. The first image stabilization operation may be driven by the first coil 461, and the second image stabilization operation may be driven by the second coil 462. The first image stabilization operation and the second image stabilization operation may be performed independently and sequentially or simultaneously.

The camera module illustrated in FIGS. 10 and 11 is a diagram illustrating a basic state in which an image stabilization operation is not performed.

In an embodiment of the disclosure, during the first image stabilization operation, the camera module 400 may apply a current to the first coil 461. The current flowing in the first coil 461 may form a magnetic field, and the magnetic field may electromagnetically interact with the N pole and the S pole of the first magnet 470, and thus a driving force may be applied to the first magnet 470 in the Y-axis direction.

In an embodiment of the disclosure, during the first image stabilization operation, the first holder 430 and the lens assembly 420 may move together in the Y-axis direction. In an embodiment of the disclosure, during the first image stabilization operation, the first holder 430 may move in the Y-axis direction, and the guide structure 440 and the second holder 450 may not move. In the first image stabilization operation, the first holder 430 may move in the +Y-axis direction until the first connecting portion 433 contacts the first inner wall 4431 of the first groove 443 of the guide structure 440. In the first image stabilization operation, the first holder 430 may move in the −Y-axis direction until the first connecting portion 433 contacts the second inner wall 4432 of the first groove 443 of the guide structure 440. For example, the first groove 443 of the guide structure 440 and the first connecting portion 433 of the first holder 430 may function as a stopper for limiting a movement range of the first holder 430 and the lens assembly 420.

In an embodiment of the disclosure, during the first image stabilization operation, the first holder 430 and the lens assembly 420 may move in the +Y-axis direction until the second connecting portion 434 contacts a first end 4411 (e.g., an end in the −Y-axis direction) of the first portion 441 of the guide structure 440. The first end 4411 of the guide structure 440 and the second connecting portion 434 of the first holder 430 may function as a stopper for limiting the movement range of the first holder 430 and the lens assembly 420.

In an embodiment of the disclosure, the sum of the distance d between the first inner wall 4431 and the first connecting portion 433 that is measured in the Y-axis direction and the distance d between the second inner wall 4432 and the first connecting portion 433 that is measured in the Y-axis direction may be formed to be substantially equal to a maximum displacement of the lens assembly 420 in the Y-axis direction. The measured distance d may be equal to the distance between the first end 4411 and the second connecting portion 434.

In an embodiment of the disclosure, during the first image stabilization operation, the first ball (e.g., the first ball 491 in FIGS. 8, 9A, and 9B) may provide a rolling friction force between the guide structure 440 fixed in the Y-axis direction and the first holder 430 moving in the Y-axis direction.

In an embodiment of the disclosure, during the second image stabilization operation, the camera module 400 may apply a current to the second coil 462. The current flowing in the second coil 462 may form a magnetic field, and the magnetic field may electromagnetically interact with any one of the N pole or the S pole of the first magnet 470, and thus a driving force may be applied to the first magnet 470 in the X-axis direction. For example, an attractive force or a repulsive force may act between the first magnet 470 and the second coil 462.

In an embodiment of the disclosure, during the second image stabilization operation, the first holder 430, the lens assembly 420, and the guide structure 440 may move together in the X-axis direction. In an embodiment of the disclosure, during the second image stabilization operation, the first holder 430 and the guide structure 440 may move in the X-axis direction, and the second holder 450 may be fixed at a specified position in the X-axis direction. In an embodiment of the disclosure, during the second image stabilization operation, the distances in the X-axis direction measured from the first magnet 470 to the first coil 461 and the second coil 462 may vary. For example, when a repulsive force is generated between the first magnet 470 and the second coil 462, the guide structure 440 and the first holder 430 may move in the −X-axis direction, and the guide structure 440 and the first holder 430 may move in the +X-axis direction when an attractive force is generated between the first magnet 470 and the second coil 462.

In an embodiment of the disclosure, during the second image stabilization operation, the second ball (e.g., the second ball 492 in FIGS. 8, 9A, and 9B) may provide a rolling friction force between the second holder 450 fixed in the X-axis direction and the guide structure 440 moving in the X-axis direction. During the second image stabilization operation, the first ball 491 may move in the X-axis direction while being positioned between the first holder 430 and the first portion 441 of the guide structure 440.

In an embodiment of the disclosure, the first coil 461 may be formed so that a current flows in a rotational direction around an arbitrary axis x1 substantially parallel to the X-axis direction. For example, the first coil 461 may include a wound conductive wire or a printed conductive pattern around the arbitrary axis x1 substantially parallel to the X axis.

In an embodiment of the disclosure, the second coil 462 may be formed so that a current flows in a rotational direction around an arbitrary axis x2 substantially parallel to the X-axis direction. For example, the second coil 462 may include a wound conductive wire or a printed conductive pattern around the arbitrary axis x2 substantially parallel to the X axis.

Figure 12A:
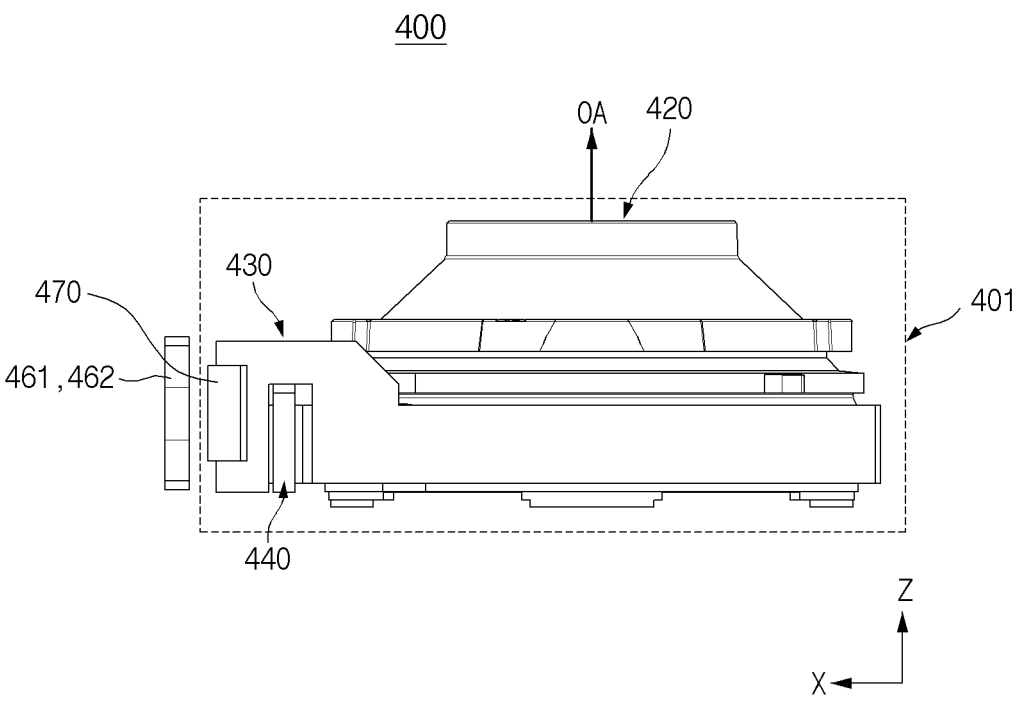
FIGS. 12A and 12B are diagrams illustrating an auto-focus operation and an image stabilization operation of the camera module according to various embodiments of the disclosure.
Figure 12B:
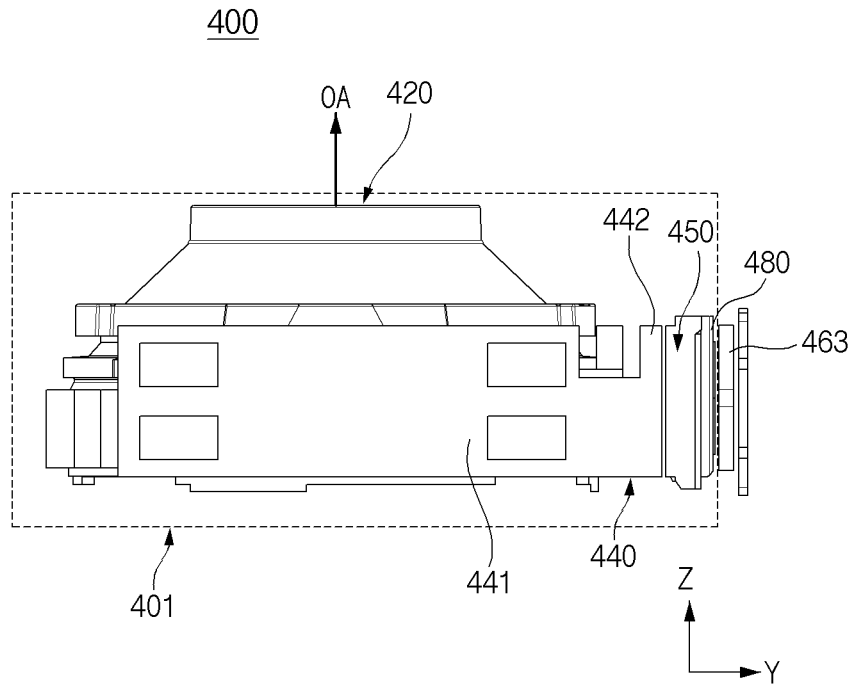

FIGS. 12A and 12B are diagrams illustrating an auto-focus operation and an image stabilization operation of a camera module according to various embodiments of the disclosure. FIG. 12A is a cross-sectional view taken along line A-A' of FIG. 10. FIG. 12B is a cross-sectional view taken along line B-B' of FIG. 10.

Referring to FIGS. 12A and 12B, the camera module 400 according to an embodiment may be configured to perform an auto focus operation. The auto focus operation may be performed by moving the lens assembly 420 in the direction of the optical axis (OA). Accordingly, the distance between the lens included in the lens assembly 420 and the image sensor (e.g., the image sensor 419 of FIG. 5) fixedly disposed in the camera housing may be adjusted. The auto focus operation may be performed independently of the image stabilization operation.

In an embodiment of the disclosure, the auto focus operation may be driven by the third coil 463. The third coil 463 may be disposed to face the second magnet 480 disposed in the second holder 450. For example, the third coil 463 may face the second magnet 480 in the Y-axis direction. During the auto focus operation, the camera module 400 may apply a current to the third coil 463. The current flowing in the third coil 463 may form a magnetic field, and the magnetic field may electromagnetically interact with the N pole and the S pole of the second magnet 480, and thus a driving force may be applied to the second magnet 480 in the Z-axis direction.

In an embodiment of the disclosure, during the auto focus operation, the structures (e.g., the lens assembly 420, the first holder 430, the guide structure 440, and the second holder 450) included in the camera assembly 401 may move in the direction of the optical axis (e.g., the Z-axis direction). For example, the second holder 450 and the guide structure 440 may be coupled to move together in the Z-axis direction through the second ball (e.g., the second ball 492 in FIGS. 8, 9A, and 9B). For example, since the second recess 449 and the fourth recess 459 illustrated in FIGS. 8, 9A, and 9B have a shape of extending longer in the X-axis direction, during the auto focus operation, the second ball 492 may transmit the driving force in the Z-axis direction applied to the second holder 450 to the guide structure 440 without rolling. Similarly, the guide structure 440 and the first holder 430 may be coupled to move together in the Z-axis direction through the first ball (e.g., the first ball 491 of FIGS. 8, 9A, and 9B). Since the first recess 448 and the third recess 438 illustrated in FIGS. 8, 9A, and 9B have a shape of extending longer in the Y-axis direction, during the auto focus operation, the first ball 491 may transmit the driving force in the Z-axis direction applied to the guide structure 440 to the first holder 430 without rolling.

Referring to FIG. 12A, during the second image stabilization operation, the lens assembly 420, the first holder 430, and the guide structure 440 may move in the X-axis direction, and the second holder 450, the first coil 461, the second coil 462, and the third coil 463 may not move.

Referring to FIG. 12B, during the first image stabilization operation, the lens assembly 420 and the first holder 430 may move in the Y-axis direction, and the guide structure 440, the second holder 450, the first coil 461, the second coil 462, and the third coil 463 may not move.

Referring to FIGS. 12A and 12B, during the auto focus operation, the camera assembly 401 may move in the Z-axis direction relative to the first coil 461, the second coil 462, and the third coil 463 disposed in the camera housing (e.g., the camera housing 410 of FIG. 4). For example, the lens assembly 420, the first holder 430, the guide structure 440, and the second holder 450 may move in the Z-axis direction, and the first coil 461, the second coil 462, and the third coil 463 may not move.

The camera module 400 according to the embodiments disclosed in the disclosure may include the camera housing 410 including the image sensor 419, the lens assembly 420 including a lens aligned with the image sensor 419 in a direction of the optical axis, the first holder 430 coupled to the lens assembly 420 and configured to move together with the lens assembly 420 in a first direction perpendicular to the optical axis and a second direction perpendicular to each of the optical axis and the first direction, the first magnet 470 being disposed on a first side surface of the first holder 430, the first coil 461 disposed on a first inner side surface of the camera housing 410, the first coil 461 being disposed to at least partially overlap each of the N-pole region and the S-pole region of the first magnet 470 when viewed in the second direction, and the second coil 462 disposed on the first inner side surface of the camera housing 410 and disposed adjacent to the first coil, the second coil 462 being disposed to at least partially overlap any one of the N-pole region and the S-pole region of the first magnet 470 when viewed in the second direction.

In various embodiments of the disclosure, the camera module 400 may be configured to move the lens assembly 420 and the first holder 430 in the first direction by applying an electrical signal to the first coil 461 and move the lens assembly 420 and the first holder 430 in the second direction by applying an electrical signal to the second coil 462.

In various embodiments of the disclosure, the N-pole region may be positioned in the first direction from the S-pole region.

In various embodiments of the disclosure, the first magnet 470 may be formed so that an area of the N-pole region and an area of the S-pole region are different.

In various embodiments of the disclosure, the S-pole region extends longer in the first direction than the N-pole region, and the second coil 462 may be disposed to face the S-pole region when viewed in the second direction.

In various embodiments of the disclosure, the first coil 461 may include the wound wire surrounding a first space or a conductive pattern surrounding a first region, and a boundary line between the N-pole region and the S-pole region may be positioned in the first space or the first region when viewed in the second direction.

In various embodiments of the disclosure, the first coil 461 may include a portion extending in the first direction by a first length, and the second coil 462 may include a portion extending in the first direction by a second length longer than the first length.

In various embodiments of the disclosure, the first coil 461 may include the 1-1 portion 461-1 and the 1-2 portion 461-2 extending in a direction parallel to the optical axis, the 1-1 portion 461-1 may face the N-pole region, and the 1-2 portion 461-2 may face the S-pole region.

In various embodiments of the disclosure, a distance measured in the first direction between the 1-1 portion 461-1 and the 1-2 portion 461-2 may be greater than a displacement by which the lens assembly 420 and the first holder 430 are movable in the first direction.

In various embodiments of the disclosure, the second coil 462 may face the S-pole region when viewed in the second direction and have a first length measured along the first direction, the S-pole region may extend in the first direction by a second length, and a difference between the second length and the first length may be greater than a displacement by which the lens assembly 420 and the first holder 430 are movable in the first direction.

In various embodiments of the disclosure, the first holder 430 may include the body 431 on which the lens assembly 420 is disposed, and the side portion 432 on which the first magnet 470 is disposed, the camera module 400 may further include the guide structure 440 positioned in a space between the body 431 and the side portion 432 and at least partially extending long in the first direction, and the lens assembly 420 and the first holder 430 may be configured to move in the first direction relative to the guide structure 440 and move in the second direction together with the guide structure 440.

In various embodiments of the disclosure, the camera module 400 may include the first ball 491 disposed between the guide structure 440 and the side portion 432 of the first holder 430, and the first ball 491 may be configured to provide a rolling friction force between the side portion 432 of the first holder 430 and the guide structure 440 when the lens assembly 420 and the first holder 430 move in the first direction.

In various embodiments of the disclosure, the first recess 448 in which at least a portion of the first ball 491 is positioned and that extends long in the first direction may be formed in the first portion 441 of the guide structure 440, the second recess 449 in which at least a portion of the first ball 491 is positioned and that extends long in the first direction may be formed in the side portion 432 of the first holder 430, and the first recess 448 and the second recess 449 may at least partially overlap when viewed in the second direction.

In various embodiments of the disclosure, the camera module 400 may include the third coil 463 disposed on a second inner side surface of the camera housing 410 and the second holder 450 including the second magnet 480 disposed between the second inner side surface and the first holder 430 and at least partially overlapping the third coil 463 when viewed in the first direction, and the camera module 400 may be configured to adjust a distance between the lens and the image sensor 419 by moving the first holder 430 and the lens assembly 420 in a direction parallel to the optical axis using the third coil 463.

In various embodiments of the disclosure, the first holder 430 may include the body 431 on which the lens assembly 420 is disposed, and the side portion 432 on which the first magnet 470 is disposed, the camera module 400 may include the guide structure 440 including the first portion 441 extending in the first direction and the second portion 442 extending in the second direction, and the guide structure 440 may be disposed so that at least a portion of the first portion is positioned in a space between the body 431 and the side portion 432 and at least a portion of the second portion 442 is positioned in a space between the second holder 450 and the first holder 430, and be configured to move in the second direction relative to the second holder 450 together with the first holder 430 and the lens assembly 420.

In various embodiments of the disclosure, the second ball 492 may be disposed between the second holder 450 and the second portion 442 of the guide structure 440, and the second ball 492 may be configured to provide a roll friction force between the second holder 450 and the second portion 442 of the guide structure 440 when the lens assembly 420, the first holder 430, and the guide structure 440 move in the second direction.

In various embodiments of the disclosure, the first holder 430 may further include the connecting portion 433 connecting the body 431 and the side portion 432, the connecting portion 433 may be at least partially positioned in the first groove 443 formed in the first portion 441 of the guide structure 440, and the lens assembly 420 and the first holder 430 may be configured to move in the first direction with the connecting portion 433 positioned between the first inner wall 4431 and the second inner wall 4432 of the first groove 443.

In various embodiments of the disclosure, the third coil 463 may be disposed to at least partially overlap each of the N-pole region and the S-pole region of the second magnet 480, and the N-pole region may be positioned in a direction parallel to the optical axis from the S-pole region.

The electronic device 300 according to the embodiments of the disclosure disclosed in the disclosure may include the housing 310 and the camera module 400 disposed in the housing 310, the camera module 400 may include the camera housing 410, the camera assembly 401 disposed in the camera housing 410 and including the lens assembly 420, the first driving unit including the first coil 461 and the second coil 462 disposed on a first inner side surface of the camera housing 410, and the first magnet 470 disposed on a first side surface of the camera assembly 401, and the second driving unit including the third coil 463 disposed on a second inner side surface of the camera housing 410 and the second magnet 480 disposed on a second side surface of the camera assembly 401, the first magnet 470 may be configured so that a first facing surface facing the first coil 461 and the second coil 462 has an N-pole region and an S-pole region, the first coil 461 may at least partially overlap each of the N-pole region and the S-pole region of the first magnet 470 when viewed in a second direction perpendicular to an optical axis, and the second coil 462 may be configured to at least partially overlap any one of the N-pole region and the S-pole region of the first magnet 470 when viewed in the second direction perpendicular to the optical axis.

In various embodiments of the disclosure, the electronic device 300 may be configured to move the lens assembly 420 in the first direction perpendicular to each of the second direction and the optical axis using the first coil 461 and move the lens assembly 420 in the second direction using the second coil 462, and configured to move the camera assembly in the direction parallel to the optical axis using the third coil 463.

In various embodiments of the disclosure, the second coil 462 may face the S-pole region, the S-pole region may be positioned in the first direction from the N-pole region, and the S-pole region may extend longer in the first direction than the N-pole region.

It should be appreciated that various embodiments of the disclosure and the terms used therein are not intended to limit the technological features set forth herein to particular embodiments and include various changes, equivalents, or replacements for a corresponding embodiment. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

In this document, "adapted to or configured to" can be used interchangeably with, for example, "adapted to," "having the ability to," "changed to," "made to," "capable of," or "designed to" in hardware or software, depending on the situation. In some contexts, the expression "device configured to" can mean that the device is "capable of" in conjunction with other devices or components. For example, the phrase "a processor set up (or configured) to perform A, B, and C" may include a dedicated processor (e.g., an embedded processor) to perform those operations, or stored in a memory device (e.g., the memory 130). By executing one or more programs, it may mean a general-purpose processor (e.g., CPU or AP) capable of performing corresponding operations.

The term "module" used herein may represent, for example, a unit including one of hardware, software and firmware or a combination thereof. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" may include at least one of an application-specific integrated circuit (ASIC) chip, a field-programmable gate array (FPGA), and a programmable-logic device for performing some operations, which are known or will be developed.

At least a part of devices (e.g., modules or functions thereof) or methods (e.g., operations) according to various embodiments of the disclosure may be implemented as instructions stored in a computer-readable storage medium in the form of a program module. In the case where the instructions are performed by a processor (e.g., the processor 120), the processor may perform functions corresponding to the instructions. The computer-readable storage medium may be, for example, the memory 130. A computer-readable recording medium may include a hard disk, a floppy disk, a magnetic medium (e.g., a magnetic tape), an optical medium (e.g., a compact disc read only memory (CD-ROM), digital versatile disc (DVD)), a magneto-optical medium (e.g., a floptical disk), or a hardware device (e.g., a read only memory (ROM), a random access memory (RAM), a flash memory, or the like). The program instructions may include machine language codes generated by compilers and high-level language codes that can be executed by computers using interpreters.

According to various embodiments of the disclosure, each component (e.g., a module or a program) of the above-described components may include a single entity or multiple entities, and some of the multiple entities may be separately disposed in different components. According to various embodiments of the disclosure, one or more of the above-described components may be omitted, or one or more other components may be added. Alternatively or additionally, a plurality of components (e.g., modules or programs) may be integrated into a single component. In such a case, according to various embodiments of the disclosure, the integrated component may still perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A camera module comprising:
a camera housing including an image sensor;
a lens assembly including a lens aligned with the image sensor in a direction of an optical axis;
a first holder coupled to the lens assembly and configured to move together with the lens assembly in a first direction perpendicular to the optical axis and a second direction perpendicular to each of the optical axis and the first direction, a first magnet being disposed on a first side surface of the first holder;

a first coil disposed on a first inner side surface of the camera housing, the first coil being disposed to at least partially overlap each of a first polarity region and a second polarity region of the first magnet when viewed in the second direction; and a second coil disposed on the first inner side surface of the camera housing and disposed adjacent to the first coil in the first direction, the second coil being disposed to at least partially overlap, while an entire length of the second coil along the first direction overlaps, either the first polarity region or the second polarity region of the first magnet when viewed in the second direction.

2. The camera module of claim 1, wherein the camera module is configured to:

move the lens assembly and the first holder in the first direction by applying an electrical signal to the first coil, and move the lens assembly and the first holder in the second direction by applying an electrical signal to the second coil.

3. The camera module of claim 1, wherein the first polarity region is positioned in the first direction from the second polarity region.

4. The camera module of claim 1, wherein the first magnet is formed so that an area of the first polarity region and an area of the second polarity region are different.

5. The camera module of claim 1, wherein the second polarity region extends longer in the first direction than the first polarity region, and wherein the second coil is disposed to face the second polarity region when viewed in the second direction.

6. The camera module of claim 1, wherein the first coil includes a wound wire surrounding a first space or a conductive pattern surrounding a first region, and wherein a boundary line between the first polarity region and the second polarity region is positioned in the first space or the first region when viewed in the second direction.

7. The camera module of claim 1, wherein the first coil includes a portion extending in the first direction by a first length, and wherein the second coil includes a portion extending in the first direction by a second length longer than the first length, the second length corresponding to the entire length of the second coil along the first direction.

8. The camera module of claim 1, wherein the first coil includes a 1-1 portion and a 1-2 portion extending in a direction parallel to the optical axis, wherein the 1-1 portion faces the first polarity region, and wherein the 1-2 portion faces the second polarity region.

9. The camera module of claim 8, wherein a distance measured in the first direction between the 1-1 portion and the 1-2 portion is greater than a displacement by which the lens assembly and the first holder are movable in the first direction.

10. The camera module of claim 1, wherein the second coil faces the second polarity region when viewed in the second direction and has a first length corresponding to the entire length of the second coil along the first direction, wherein the second polarity region extends in the first direction by a second length, and wherein a difference between the second length and the first length is greater than a displacement by which the lens assembly and the first holder are movable in the first direction.

11. The camera module of claim 1, wherein the first holder includes:

a body on which the lens assembly is disposed, and a side portion on which the first magnet is disposed, wherein the camera module further includes:

a guide structure positioned in a space between the body and the side portion, and at least partially extending long in the first direction, and wherein the lens assembly and the first holder are configured to:

move in the first direction relative to the guide structure, and move in the second direction together with the guide structure.

12. The camera module of claim 11, wherein the camera module includes:

a third coil disposed on a second inner side surface of the camera housing, a second holder including a second magnet disposed between the second inner side surface and the first holder, and at least partially overlapping the third coil when viewed in the first direction, and wherein the camera module is configured to adjust a distance between the lens and the image sensor by moving the first holder and the lens assembly in a direction parallel to the optical axis using the third coil.

13. The camera module of claim 12, wherein the camera module includes a guide structure including:

a first portion extending in the first direction, and a second portion extending in the second direction, wherein the guide structure is disposed so that at least a portion of the first portion is positioned in a space between the body and the side portion and at least a portion of the second portion is positioned in a space between the second holder and the first holder, and wherein the guide structure is configured to move in the second direction relative to the second holder together with the first holder and the lens assembly.

14. The camera module of claim 13, wherein the first holder further includes a connecting portion connecting the body and the side portion, wherein the connecting portion is at least partially positioned in a first groove formed in the first portion of the guide structure, and wherein the lens assembly and the first holder are configured to move in the first direction with the connecting portion positioned between a first inner wall and a second inner wall of the first groove.

15. An electronic device comprising:

a housing and a camera module disposed in the housing, wherein the camera module includes:

a camera housing, a camera assembly disposed in the camera housing and including a lens assembly, a first driving unit including:

a first coil and a second coil disposed on a first inner side surface of the camera housing, and a first magnet disposed on a first side surface of the camera assembly, and a second driving unit including:

a third coil disposed on a second inner side surface of the camera housing, and a second magnet disposed on a second side surface of the camera assembly, wherein the first magnet is configured so that a first facing surface facing the first coil and the second coil has a first polarity region and a second polarity region, wherein the first coil at least partially overlaps each of the first polarity region and the second polarity region of the first magnet when viewed in a second direction perpendicular to an optical axis, and wherein the second coil disposed adjacent to the first coil in a first direction perpendicular to each of the optical axis and the second direction, the second coil being configured to at least partially overlap, while an entire length of the second coil along the first direction overlaps, either the first polarity region or the second polarity region of the first magnet when viewed in the second direction.

16. The electronic device of claim 15, wherein the camera module is configured to:

move the lens assembly and a first holder in the first direction by applying an electrical signal to the first coil, and move the lens assembly and the first holder in the second direction by applying an electrical signal to the second coil.

17. The electronic device of claim 15, wherein the first polarity region is positioned in the first direction from the second polarity region.

18. The electronic device of claim 15, wherein the first magnet is formed so that an area of the first polarity region and an area of the second polarity region are different.

19. The electronic device of claim 15, wherein the second polarity region extends longer in the first direction than the first polarity region, and wherein the second coil is disposed to face the second polarity region when viewed in the second direction.

20. The electronic device of claim 15, wherein the first coil includes a wound wire surrounding a first space or a conductive pattern surrounding a first region, and wherein a boundary line between the first polarity region and the second polarity region is positioned in the first space or the first region when viewed in the second direction.

* * * * *